US009032151B2

(12) United States Patent
Iyigun et al.

(10) Patent No.: US 9,032,151 B2
(45) Date of Patent: May 12, 2015

(54) METHOD AND SYSTEM FOR ENSURING RELIABILITY OF CACHE DATA AND METADATA SUBSEQUENT TO A REBOOT

(75) Inventors: Mehmet Iyigun, Bellevue, WA (US); Yevgeniy Bak, Redmond, WA (US); Michael Fortin, Redmond, WA (US); David Fields, Kirkland, WA (US); Cenk Ergan, Bellevue, WA (US); Alexander Kirshenbaum, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1007 days.

(21) Appl. No.: 12/271,472

(22) Filed: Nov. 14, 2008

(65) Prior Publication Data

US 2010/0070701 A1   Mar. 18, 2010

Related U.S. Application Data

(60) Provisional application No. 61/097,079, filed on Sep. 15, 2008.

(51) Int. Cl.
*G06F 12/08* (2006.01)
*G06F 12/14* (2006.01)
(Continued)

(52) U.S. Cl.
CPC .... *G06F 12/0866* (2013.01); *G06F 2212/2146* (2013.01); *G06F 11/1441* (2013.01);
(Continued)

(58) Field of Classification Search
CPC . G06F 12/0866; G06F 11/1441; G06F 12/14; G06F 2212/1052; G06F 2212/2146; G06F 2212/222; G06F 2212/2022
USPC .................................. 711/113, 115, 118, 141
See application file for complete search history.

(56) References Cited

U.S. PATENT DOCUMENTS 4,476,526 A   10/1984  Dodd
4,612,612 A    9/1986  Woffinden et al.
(Continued)

FOREIGN PATENT DOCUMENTS

CN    1266229     9/2000
CN    1465009    12/2003
(Continued)

OTHER PUBLICATIONS

International Search Report dated Mar. 12, 2010 from PCT/US2009/056419.
(Continued)

*Primary Examiner* — Sanjiv Shah
*Assistant Examiner* — Glenn Gossage
(74) *Attorney, Agent, or Firm* — Henry Gabryjelski; Kate Drakos; Micky Minhas

(57) ABSTRACT

To ensure that the contents of a non-volatile memory device cache may be relied upon as accurately reflecting data stored on disk storage, it may be determined whether the cache contents and/or disk contents are modified during a power transition, causing cache contents to no longer accurately reflect data stored in disk storage. The cache device may be removable from the computer, and unexpected removal of the cache device may cause cache contents to no longer accurately reflect data stored in disk storage. Cache metadata may be managed during normal operations and across power transitions, ensuring that cache metadata may be efficiently accessed and reliably saved and restored across power transitions. A state of a log used by a file system may be determined prior to and subsequent to reboot of an operating system in order to determine whether data stored on a cache device may be reliably used.

19 Claims, 8 Drawing Sheets

(51) Int. Cl.
*G06F 12/00* (2006.01)
*G06F 11/14* (2006.01)

(52) U.S. Cl.
CPC ............ *G06F12/0862* (2013.01); *G06F 12/14*
(2013.01); *G06F 2212/1052* (2013.01); *G06F 2212/2022* (2013.01); *G06F 2212/222* (2013.01); *G06F 2212/466* (2013.01); *Y02B 60/1225* (2013.01)

(56) References Cited

U.S. PATENT DOCUMENTS

| | | | |
|---|---|---|---|
| 4,945,474 A | 7/1990 | Elliott | |
| 4,972,316 A | 11/1990 | Dixon | |
| 4,979,108 A | 12/1990 | Crabbe | |
| 5,088,026 A | 2/1992 | Bozman et al. | |
| 5,175,834 A | 12/1992 | Sawai | |
| 5,263,136 A | 11/1993 | DeAguiar | |
| 5,297,258 A | 3/1994 | Hale | |
| 5,307,497 A | 4/1994 | Feigenbaum | |
| 5,394,531 A | 2/1995 | Smith | |
| 5,398,325 A | 3/1995 | Chang et al. | |
| 5,420,998 A | 5/1995 | Horning | |
| 5,454,098 A | 9/1995 | Pisello | |
| 5,463,739 A | 10/1995 | Albaugh | |
| 5,524,230 A | 6/1996 | Sakaue | |
| 5,551,002 A | 8/1996 | Rosich | |
| 5,557,770 A | 9/1996 | Bhide | |
| 5,561,783 A * | 10/1996 | Vanka et al. | 711/141 |
| 5,572,660 A | 11/1996 | Jones | |
| 5,574,877 A | 11/1996 | Dixit et al. | |
| 5,586,290 A | 12/1996 | Hirai et al. | |
| 5,603,001 A | 2/1997 | Sukegawa | |
| 5,611,067 A | 3/1997 | Okamoto | |
| 5,636,355 A | 6/1997 | Ramakrishnan et al. | |
| 5,652,857 A | 7/1997 | Shimoi | |
| 5,666,532 A | 9/1997 | Saks | |
| 5,668,968 A | 9/1997 | Wu | |
| 5,717,954 A | 2/1998 | Grieff | |
| 5,720,029 A | 2/1998 | Kern | |
| 5,740,434 A | 4/1998 | Eastep | |
| 5,751,932 A | 5/1998 | Horst | |
| 5,754,782 A | 5/1998 | Masada | |
| 5,754,888 A | 5/1998 | Yang | |
| 5,764,877 A | 6/1998 | Lomet | |
| 5,806,074 A | 9/1998 | Souder | |
| 5,809,280 A | 9/1998 | Chard | |
| 5,809,543 A | 9/1998 | Byers et al. | |
| 5,832,515 A | 11/1998 | Ledain | |
| 5,845,293 A | 12/1998 | Veghte et al. | |
| 5,860,083 A | 1/1999 | Sukegawa | |
| 5,875,466 A | 2/1999 | Wakerly | |
| 5,897,638 A | 4/1999 | Lasser | |
| 5,897,660 A | 4/1999 | Reinders | |
| 5,900,022 A | 5/1999 | Kranich | |
| 5,900,870 A | 5/1999 | Malone | |
| 5,923,838 A | 7/1999 | Hongo | |
| 5,937,433 A | 8/1999 | Lee et al. | |
| 5,943,692 A | 8/1999 | Marberg | |
| 5,991,847 A | 11/1999 | Ballard et al. | |
| 5,996,054 A | 11/1999 | Ledain | |
| 6,000,006 A | 12/1999 | Bruce | |
| 6,018,433 A | 1/2000 | Thayne | |
| 6,018,746 A | 1/2000 | Hill | |
| 6,026,027 A | 2/2000 | Terrell | |
| 6,047,291 A | 4/2000 | Anderson | |
| 6,073,232 A | 6/2000 | Kroeker | |
| 6,092,160 A | 7/2000 | Marsters | |
| 6,098,075 A | 8/2000 | Becraft | |
| 6,101,601 A | 8/2000 | Matthews | |
| 6,108,004 A | 8/2000 | Medl | |
| 6,112,024 A | 8/2000 | Almond | |
| 6,122,685 A | 9/2000 | Bachmat | |
| 6,128,627 A | 10/2000 | Mattis et al. | |
| 6,138,125 A | 10/2000 | DeMoss | |
| 6,148,368 A | 11/2000 | DeKoning | |
| 6,185,629 B1 | 2/2001 | Simpson | |
| 6,189,071 B1 | 2/2001 | Bachmat | |
| 6,199,195 B1 | 3/2001 | Goodwin | |
| 6,209,088 B1 | 3/2001 | Reneris | |
| 6,230,233 B1 | 5/2001 | Lofgren | |
| 6,237,065 B1 | 5/2001 | Banerjia | |
| 6,240,414 B1 | 5/2001 | Beizer | |
| 6,247,026 B1 | 6/2001 | Waldo | |
| 6,249,841 B1 | 6/2001 | Sikes | |
| 6,272,534 B1 | 8/2001 | Guha | |
| 6,275,436 B1 | 8/2001 | Tobita | |
| 6,298,428 B1 | 10/2001 | Munroe et al. | |
| 6,301,635 B2 | 10/2001 | Bothwell | |
| 6,311,232 B1 | 10/2001 | Cagle | |
| 6,314,433 B1 | 11/2001 | Mills | |
| 6,317,806 B1 | 11/2001 | Audityan | |
| 6,321,234 B1 | 11/2001 | Debrunner | |
| 6,338,056 B1 | 1/2002 | Dessloch | |
| 6,338,126 B1 | 1/2002 | Ohran | |
| 6,345,000 B1 | 2/2002 | Wong | |
| 6,360,330 B1 | 3/2002 | Mutalik | |
| 6,366,996 B1 | 4/2002 | Hobson | |
| 6,370,534 B1 | 4/2002 | Odom | |
| 6,370,541 B1 | 4/2002 | Chou | |
| 6,378,043 B1 | 4/2002 | Girkar | |
| 6,401,093 B1 | 6/2002 | Anand | |
| 6,408,058 B1 | 6/2002 | Lanet | |
| 6,418,510 B1 | 7/2002 | Lamberts | |
| 6,425,057 B1 | 7/2002 | Cherkasova | |
| 6,434,682 B1 | 8/2002 | Ashton | |
| 6,438,750 B1 | 8/2002 | Anderson | |
| 6,454,159 B1 | 9/2002 | Takushima | |
| 6,477,564 B1 | 11/2002 | Freyssinet | |
| 6,505,205 B1 | 1/2003 | Kothuri | |
| 6,513,051 B1 | 1/2003 | Bolosky | |
| 6,516,380 B2 | 2/2003 | Kenchammana-Hoskote | |
| 6,519,597 B1 | 2/2003 | Cheng | |
| 6,535,949 B1 | 3/2003 | Parker | |
| 6,539,456 B2 | 3/2003 | Stewart | |
| 6,542,904 B2 | 4/2003 | Crus | |
| 6,546,472 B2 | 4/2003 | Atkinson et al. | |
| 6,556,983 B1 | 4/2003 | Altschuler | |
| 6,557,077 B1 * | 4/2003 | Ghosh et al. | 711/118 |
| 6,560,702 B1 | 5/2003 | Gharda | |
| 6,567,889 B1 | 5/2003 | Dekoning | |
| 6,578,046 B2 | 6/2003 | Chang | |
| 6,615,313 B2 | 9/2003 | Kato | |
| 6,629,201 B2 | 9/2003 | Dempsey | |
| 6,636,942 B2 | 10/2003 | Greco | |
| 6,640,278 B1 | 10/2003 | Nolan | |
| 6,647,472 B2 | 11/2003 | Atkinson | |
| 6,651,141 B2 | 11/2003 | Adrangi | |
| 6,671,699 B1 | 12/2003 | Black | |
| 6,671,757 B1 | 12/2003 | Multer | |
| 6,684,229 B1 | 1/2004 | Luong | |
| 6,687,158 B2 | 2/2004 | Yano | |
| 6,694,336 B1 | 2/2004 | Multer | |
| 6,714,935 B1 | 3/2004 | Delo | |
| 6,718,361 B1 | 4/2004 | Basani | |
| 6,721,863 B1 | 4/2004 | Endo | |
| 6,738,789 B2 | 5/2004 | Multer | |
| 6,742,097 B2 | 5/2004 | Woo | |
| 6,751,658 B1 | 6/2004 | Haun | |
| 6,757,696 B2 | 6/2004 | Multer | |
| 6,760,736 B2 | 7/2004 | Waldo | |
| 6,769,050 B1 | 7/2004 | Ware | |
| 6,771,536 B2 | 8/2004 | Li | |
| 6,772,178 B2 | 8/2004 | Mandal | |
| 6,782,453 B2 | 8/2004 | Keltcher | |
| 6,788,612 B2 | 9/2004 | Hsu | |
| 6,871,271 B2 | 3/2005 | Ohran | |
| 6,877,081 B2 | 4/2005 | Herger | |
| 6,879,266 B1 | 4/2005 | Dye | |
| 6,901,499 B2 | 5/2005 | Aasheim | |
| 6,910,106 B2 | 6/2005 | Sechrest | |
| 6,918,022 B2 | 7/2005 | Li | |
| 6,920,533 B2 | 7/2005 | Coulson et al. | |
| 6,928,521 B1 | 8/2005 | Burton et al. | |

(56) References Cited

U.S. PATENT DOCUMENTS

| | | |
|---|---|---|
| 6,930,919 B2 | 8/2005 | Lee |
| 6,938,116 B2 | 8/2005 | Kim |
| 6,941,423 B2 | 9/2005 | Coulson |
| 6,959,318 B1 | 10/2005 | Tso |
| 6,996,660 B1 | 2/2006 | Moore |
| 7,007,072 B1 | 2/2006 | Guha |
| 7,010,645 B2 | 3/2006 | Hetzler |
| 7,017,037 B2 | 3/2006 | Fortin |
| 7,036,040 B2* | 4/2006 | Nicholson et al. ........... 714/6.31 |
| 7,039,765 B1 | 5/2006 | Wilkes |
| 7,043,610 B2 | 5/2006 | Horn et al. |
| 7,057,942 B2 | 6/2006 | Suda |
| 7,062,675 B1 | 6/2006 | Kemeny |
| 7,065,627 B2 | 6/2006 | Dayan |
| 7,068,575 B2 | 6/2006 | Gabryjelski |
| 7,082,495 B2 | 7/2006 | DeWhitt |
| 7,082,499 B2 | 7/2006 | Kamitani et al. |
| 7,143,120 B2 | 11/2006 | Oks |
| 7,171,532 B2 | 1/2007 | Kodama |
| 7,185,155 B2 | 2/2007 | Sechrest |
| 7,231,497 B2* | 6/2007 | Trika et al. .................... 711/141 |
| 7,284,149 B1 | 10/2007 | Fisher et al. |
| 7,366,740 B2 | 4/2008 | Sleeman |
| 7,366,866 B2 | 4/2008 | Cochran |
| 7,380,090 B2 | 5/2008 | Koseki |
| 7,395,401 B2 | 7/2008 | Sanders |
| 7,409,537 B2 | 8/2008 | Tsang |
| 7,412,369 B1 | 8/2008 | Gupta |
| 7,412,562 B2 | 8/2008 | Garney |
| 7,451,353 B2* | 11/2008 | Grimsrud ....................... 714/42 |
| 7,490,197 B2 | 2/2009 | Kirshenbaum |
| 7,631,140 B2 | 12/2009 | Saito |
| 7,644,239 B2 | 1/2010 | Ergan |
| 7,698,506 B1 | 4/2010 | Fair et al. |
| 7,698,513 B2 | 4/2010 | Sechrest |
| 7,774,508 B2 | 8/2010 | Nakamura |
| 7,805,571 B2 | 9/2010 | Kirshenbaum |
| 7,814,261 B2 | 10/2010 | Lee |
| 7,818,701 B1 | 10/2010 | Kolokowsky |
| 7,945,734 B2* | 5/2011 | Lahcanski et al. ............. 711/115 |
| 7,953,774 B2 | 5/2011 | Cong |
| 8,006,037 B2 | 8/2011 | Kirshenbaum |
| 8,032,707 B2 | 10/2011 | Iyigun et al. |
| 8,032,723 B2 | 10/2011 | Sechrest |
| 8,041,904 B2* | 10/2011 | Ergan et al. .................... 711/154 |
| 8,108,450 B2 | 1/2012 | Cong |
| 8,135,914 B2 | 3/2012 | Iyigun et al. |
| 8,255,645 B2 | 8/2012 | Ergan |
| 8,539,186 B2* | 9/2013 | Sechrest et al. ................ 711/165 |
| 2001/0007123 A1 | 7/2001 | Seguchi |
| 2001/0007999 A1 | 7/2001 | Rasmussen |
| 2001/0047462 A1 | 11/2001 | Dimitroff |
| 2002/0004876 A1 | 1/2002 | Timmer |
| 2002/0073276 A1 | 6/2002 | Howard et al. |
| 2002/0083275 A1 | 6/2002 | Kawamoto et al. |
| 2002/0087797 A1 | 7/2002 | Adrangi |
| 2002/0087816 A1 | 7/2002 | Atkinson et al. |
| 2002/0091702 A1 | 7/2002 | Mullins |
| 2002/0108017 A1 | 8/2002 | Kenchammana-Hoskote |
| 2002/0143521 A1 | 10/2002 | Call |
| 2002/0152422 A1 | 10/2002 | Sharma |
| 2002/0156970 A1 | 10/2002 | Stewart |
| 2002/0171966 A1 | 11/2002 | Ottesen |
| 2002/0178326 A1 | 11/2002 | Ohta |
| 2002/0184311 A1 | 12/2002 | Traversat et al. |
| 2002/0198891 A1 | 12/2002 | Li |
| 2002/0199075 A1 | 12/2002 | Jacobs |
| 2003/0009538 A1 | 1/2003 | Shah |
| 2003/0074524 A1 | 4/2003 | Coulson |
| 2003/0074550 A1 | 4/2003 | Wilks |
| 2003/0101320 A1 | 5/2003 | Chauvel |
| 2003/0110357 A1 | 6/2003 | Nguyen |
| 2003/0154314 A1 | 8/2003 | Mason |
| 2003/0154337 A1 | 8/2003 | Ohno |
| 2003/0158839 A1 | 8/2003 | Faybishenko |
| 2003/0177305 A1 | 9/2003 | Hetrick |
| 2003/0191916 A1 | 10/2003 | McBearty |
| 2003/0202377 A1 | 10/2003 | Harari |
| 2003/0212660 A1 | 11/2003 | Kerwin |
| 2003/0212857 A1 | 11/2003 | Pacheco |
| 2004/0003003 A1 | 1/2004 | McCartney |
| 2004/0003223 A1 | 1/2004 | Fortin |
| 2004/0010639 A1 | 1/2004 | Inoue |
| 2004/0015504 A1 | 1/2004 | Ahad |
| 2004/0019762 A1 | 1/2004 | Fukuoka et al. |
| 2004/0024795 A1 | 2/2004 | Hind |
| 2004/0034765 A1 | 2/2004 | James |
| 2004/0044776 A1 | 3/2004 | Larkin |
| 2004/0059747 A1 | 3/2004 | Olarig |
| 2004/0068627 A1 | 4/2004 | Sechrest |
| 2004/0078508 A1 | 4/2004 | Rivard |
| 2004/0093463 A1 | 5/2004 | Shang |
| 2004/0103238 A1 | 5/2004 | Avraham |
| 2004/0107200 A1 | 6/2004 | Sjogren |
| 2004/0136259 A1 | 7/2004 | Klint |
| 2004/0148611 A1 | 7/2004 | Manion et al. |
| 2004/0153694 A1 | 8/2004 | Nicholson |
| 2004/0162950 A1* | 8/2004 | Coulson ........................ 711/141 |
| 2004/0168018 A1 | 8/2004 | Aasheim |
| 2004/0172576 A1 | 9/2004 | Yoshii |
| 2004/0174631 A1 | 9/2004 | Tanaka |
| 2004/0221089 A1 | 11/2004 | Sato et al. |
| 2004/0230743 A1 | 11/2004 | Ware |
| 2004/0243612 A1 | 12/2004 | Bailey |
| 2005/0005188 A1 | 1/2005 | Hsu |
| 2005/0021907 A1 | 1/2005 | Shimada |
| 2005/0111260 A1 | 5/2005 | Nazarian |
| 2005/0125708 A1 | 6/2005 | Simon |
| 2005/0138283 A1* | 6/2005 | Garney ........................ 711/113 |
| 2005/0141284 A1 | 6/2005 | Futatsuyama |
| 2005/0145923 A1 | 7/2005 | Chen |
| 2005/0149750 A1 | 7/2005 | Lisanke |
| 2005/0160223 A1 | 7/2005 | Chen |
| 2005/0172067 A1 | 8/2005 | Sinclair |
| 2005/0193160 A1 | 9/2005 | Bhatt et al. |
| 2005/0204091 A1 | 9/2005 | Kilbuck |
| 2005/0228964 A1 | 10/2005 | Sechrest |
| 2005/0235119 A1 | 10/2005 | Sechrest |
| 2005/0239494 A1 | 10/2005 | Klassen |
| 2005/0246487 A1 | 11/2005 | Ergan |
| 2005/0251617 A1 | 11/2005 | Sinclair |
| 2005/0262378 A1 | 11/2005 | Sleeman |
| 2005/0268038 A1 | 12/2005 | Yasue |
| 2005/0286855 A1 | 12/2005 | Saitou |
| 2006/0010293 A1 | 1/2006 | Schnapp et al. |
| 2006/0074953 A1 | 4/2006 | Dettinger et al. |
| 2006/0075185 A1* | 4/2006 | Azzarito et al. ............. 711/113 |
| 2006/0080553 A1 | 4/2006 | Hall |
| 2006/0087893 A1 | 4/2006 | Nishihara |
| 2006/0090031 A1* | 4/2006 | Kirshenbaum et al. ........ 711/113 |
| 2006/0106889 A1 | 5/2006 | Mannby |
| 2006/0112195 A1 | 5/2006 | Aoyama |
| 2006/0112215 A1 | 5/2006 | Kim et al. |
| 2006/0136472 A1 | 6/2006 | Jujjuri et al. |
| 2006/0136664 A1* | 6/2006 | Trika ............................ 711/113 |
| 2006/0155931 A1 | 7/2006 | Birrell et al. |
| 2006/0177067 A1 | 8/2006 | Kim |
| 2006/0236034 A1 | 10/2006 | Pomaranski et al. |
| 2006/0248276 A1 | 11/2006 | Kilian et al. |
| 2006/0248387 A1 | 11/2006 | Nicholson |
| 2006/0277359 A1 | 12/2006 | Faber |
| 2007/0005882 A1 | 1/2007 | Gallagher |
| 2007/0011405 A1 | 1/2007 | Adusumilli |
| 2007/0043787 A1 | 2/2007 | Cannon |
| 2007/0043929 A1 | 2/2007 | Safford et al. |
| 2007/0061511 A1 | 3/2007 | Faber |
| 2007/0073764 A1 | 3/2007 | Oks |
| 2007/0150966 A1 | 6/2007 | Kirschner et al. |
| 2007/0156954 A1 | 7/2007 | Trika |
| 2007/0162700 A1 | 7/2007 | Fortin |
| 2007/0207800 A1 | 9/2007 | Daley |
| 2007/0208910 A1 | 9/2007 | Koseki |
| 2007/0233939 A1 | 10/2007 | Kim |
| 2007/0266199 A1 | 11/2007 | Peled et al. |

(56) References Cited

U.S. PATENT DOCUMENTS

| | | | | |
|---|---|---|---|---|
| 2007/0294474 | A1* | 12/2007 | Panabaker et al. | 711/113 |
| 2007/0294504 | A1 | 12/2007 | Peled et al. | |
| 2008/0010401 | A1 | 1/2008 | Royer, Jr. et al. | |
| 2008/0010415 | A1 | 1/2008 | Sawdey et al. | |
| 2008/0109625 | A1 | 5/2008 | Erlingsson et al. | |
| 2008/0162485 | A1 | 7/2008 | Long et al. | |
| 2008/0172519 | A1 | 7/2008 | Shmulevich et al. | |
| 2008/0183958 | A1 | 7/2008 | Cheriton | |
| 2009/0112949 | A1 | 4/2009 | Ergan et al. | |
| 2009/0144495 | A1 | 6/2009 | Kirshenbaum | |
| 2009/0150335 | A1 | 6/2009 | Latorre et al. | |
| 2009/0150599 | A1 | 6/2009 | Bennett | |
| 2009/0150611 | A1* | 6/2009 | Fortin et al. | 711/115 |
| 2009/0287890 | A1 | 11/2009 | Bolosky | |
| 2010/0070701 | A1 | 3/2010 | Iyigun | |
| 2010/0070747 | A1 | 3/2010 | Iyigun | |
| 2010/0082550 | A1 | 4/2010 | Cong | |
| 2010/0199043 | A1 | 8/2010 | Sechrest | |
| 2010/0199063 | A1 | 8/2010 | Sechrest | |
| 2010/0217929 | A1 | 8/2010 | Kirshenbaum | |
| 2011/0197016 | A1 | 8/2011 | Cong | |
| 2011/0276743 | A1 | 11/2011 | Kirshenbaum | |
| 2011/0314202 | A1 | 12/2011 | Iyigun | |
| 2012/0047323 | A1 | 2/2012 | Sareen | |
| 2012/0102265 | A1 | 4/2012 | Cong | |
| 2012/0173824 | A1 | 7/2012 | Iyigun et al. | |
| 2012/0290785 | A1* | 11/2012 | Ergan et al. | 711/112 |
| 2014/0047189 | A1* | 2/2014 | Fortin et al. | 711/135 |

FOREIGN PATENT DOCUMENTS

| | | |
|---|---|---|
| EP | 0 547 992 | 6/1993 |
| EP | 0 712 067 | 5/1996 |
| EP | 0 744 697 | 11/1996 |
| EP | 1 960 888 B1 | 1/2013 |
| JP | 57-161933 | 10/1982 |
| JP | 60-140446 | 7/1985 |
| JP | 01-303547 | 12/1989 |
| JP | 02-039256 | 2/1990 |
| JP | 03-147157 | 6/1991 |
| JP | 03-294942 | 12/1991 |
| JP | 04-205634 | 7/1992 |
| JP | 04-246746 | 9/1992 |
| JP | 05-062329 | 3/1993 |
| JP | 05-094353 | 4/1993 |
| JP | 05-158797 | 6/1993 |
| JP | 05-225066 | 9/1993 |
| JP | 05-282889 | 10/1993 |
| JP | 06-035802 | 2/1994 |
| JP | 06-083708 | 3/1994 |
| JP | 06-231043 | 8/1994 |
| JP | 06-236351 | 8/1994 |
| JP | 07-253935 | 10/1995 |
| JP | 08-263380 | 10/1996 |
| JP | 09-106366 | 4/1997 |
| JP | 09-146710 | 6/1997 |
| JP | 09-190382 | 7/1997 |
| JP | 10-040170 | 2/1998 |
| JP | 10-091488 | 4/1998 |
| JP | 10-154101 | 6/1998 |
| JP | 10-289155 | 10/1998 |
| JP | 11-316699 | 11/1999 |
| JP | 11-338641 | 12/1999 |
| JP | 2000-148515 | 5/2000 |
| JP | 2001-027967 | 1/2001 |
| JP | 2001-067258 | 3/2001 |
| JP | 2001-250315 | 9/2001 |
| JP | 2002-007185 | 1/2002 |
| JP | 2002-259186 | 9/2002 |
| JP | 2002-342037 | 11/2002 |
| JP | 2003-076498 | 3/2003 |
| JP | 2003-085041 | 3/2003 |
| JP | 2003-196032 | 7/2003 |
| JP | 2003-280950 | 10/2003 |
| JP | 2003-316647 | 11/2003 |
| JP | 2004-021370 | 1/2004 |
| JP | 2004-054845 | 2/2004 |
| JP | 2004-272324 | 9/2004 |
| JP | 2005-044010 | 2/2005 |
| JP | 2005-222383 | 8/2005 |
| JP | 2008-052321 | 3/2008 |
| KR | 1019990019377 | 3/1999 |
| KR | 102000039727 | 7/2000 |
| RU | 2010317 | 3/1994 |
| TW | 479194 | 3/2002 |
| TW | 502165 | 9/2002 |
| WO | WO 93/18461 | 9/1993 |
| WO | WO 97/26600 | 7/1997 |
| WO | 98/10611 | 3/1998 |
| WO | WO 01/11486 | 2/2001 |
| WO | WO 01/57675 | 8/2001 |
| WO | WO 01/75581 | 10/2001 |
| WO | 02/01365 A2 | 1/2002 |
| WO | WO 02/01364 | 1/2002 |

OTHER PUBLICATIONS

Zhu, et al., "Power Aware Storage Cache Management", Department of Illinois, University of Illinois at Urbana-Champaign, Urbana, IL. http://opera.cs.uiuc.edu/paper/TC05.pdf, 2005,pp. 1-35.

Bisson, et al., "A Hybrid Disk-Aware Spin-Down Algorithm with I/O Subsystem Support", Department of Computer Science, University of California, Santa Cruz. http://www.soe.ucsc.edu/~tbisson/papers/bisson_ipccc07.pdf, Apr. 2007, pp. 1-10.

"Non-Volatile Memory Host Controller Interface (NVMHCI) 1.0", Apr. 14, 2008. ftp://download.intel.com/standards/nvmhci/spec.pdf, pp. 1-65.

Greenan, et al., "CompulsiveFS: Making NVRAM Suitable for Extremely Reliable Storage". http://www.usenix.org/events/fast07/wips/greenan.pdf, Feb . 2007, p. 1.

Darden, "Data Integrity: The Dell|EMC Distinction". http://www.dell.com/content/topics/global.aspx/power/en/ps2q02_darden?c=us&cs=555&l=en&s=biz, Oct. 2008, pp. 1-5.

International Search Report dated May 31, 2010 from PCT/US2009/063127.

EP Supplementary Search Report, Reference FB24240, Application No. 09813565.0-1229 / 2329360 PCT/US2009056419, Apr. 3, 2012.

Archer, "ReadyBoost—Using Your USB Key to Speed Up Windows Vista," Apr. 2006, blogs.msdn.com/b/tomarcher/arhive/2006/04/14/576548.aspx , 3 pages.

Archer, "ReadyBoost Q&A," Jun. 2006, blogs.msdn.com/b/tomarcher/archive/2006/06/02/615199.aspx , 4 pages.

CDRinfo, "Microsoft Explains Vista ReadyBoost," Nov. 2006, cdrinfo.com/Sections/News/Details.aspx?NewsID=19077 , pp. 1-2.

Vitter,"External Memory Algorithms," 1998, Proceedings 17th ACM SIGACT-SIGMOD-SIGART Symposium on Principles of Database Systems, PODS '98, pp. 119-128.

Ekman,"TLB and Snoop Energy-Reduction using Virtual Caches in Low-Power Chip-Multiprocessors," Proceedings 2002 International Symposium on Low Power Electronics and Design (SLPED '02), Aug. 12-14, 2002, pp. 243-246.

Ohn, ScienceDirect, "Path conscious caching of B+ tree indexes in a shared disks cluster", Journal of Parallel and Distributed Computing, vol. 67, No. 3, Mar. 2007 (available online Dec. 15, 2006), pp. 286-301.

EP Communication for Application No. 09826570.5-1229 / 2353081 PCT/US2009063127, reference FB24586, May 29, 2012.

CN Notice on the First Office Action for Application No. 200980145878.1, Jan. 29, 2013.

Budiu, "A Dual-Disk File System: ext4", Apr. 16, 1997.

CN Notice on the First Office Action for Application No. 200980137190.9, Oct. 24, 2012.

Dove, "Windows XP for Embedded Applications", printed Jul. 10, 2008.

EP Communication for Application No. 05103690.3-2201, Apr. 24, 2008.

EP Communication for Application No. 09814983.4-2224/2329361 PCT/US2009055198, Oct. 10, 2012.

(56) References Cited

OTHER PUBLICATIONS

Fortin, "Management of External Memory Functioning as Virtual Cache", U.S. Appl. No. 11/953,312, filed Dec. 10, 2007.
iSCSI, "Performance Evaluations of iSCSI Implementation", printed Jan. 10, 2008.
JP Notice of Rejections for Application No. 2011-527865, Oct. 16, 2012.
Matthews, "Improving File System Performance with Adaptive Methods", 1999.
Mitchell, "Managing Cache Coherence in Multiprocessor Computer Systems", printed Jul. 10, 2008.
Nieplocha, "ARMCI: A Portable Aggregate Remote Memory Copy Interface", Oct. 30, 2000.
Novell, "NSS Features and Benefits", printed Jul. 10, 2008.
PCT International Search Report and Written Opinion for Application No. PCT/US2009/055198, Feb. 26, 2010.
Sreenath, "A Hybrid Computation Environment for Multibody Simulation", Mathematics and Computers in Simulation, Aug. 1992.
JP Notice of Rejection for Application No. 2012-111004, May 14, 2013.
Bolosky, "Optimizing Write Traffic to a Disk", U.S. Appl. No. 12/121,776, filed May 15, 2008.
CA Examiner's Report for Application No. 2,523,761, Feb. 26, 2013.
Cong, "Aggregation of Write Traffic to a Data Store", U.S. Appl. No. 12/234,411, filed Sep. 19, 2008.
Cong, "Aggregation of Write Traffic to a Data Store", U.S. Appl. No. 13/087,927, filed Apr. 15, 2011.
Cong, "Aggregation of Write Traffic to a Data Store", U.S. Appl. No. 13/343,985, filed Jan. 5, 2012.
IL Notification of Defects for Application No. 191502, Feb. 17, 2013.
Iyigun, "Managing Cache Data and Metadata", U.S. Appl. No. 12/271,400, filed Nov. 14, 2008.
Iyigun, "Managing Cache Data and Metadata", U.S. Appl. No. 13/221,542, filed Aug. 30, 2011.
Iyigun, "Managing Cache Data and Metadata", U.S. Appl. No. 13/365,093, filed Feb. 2, 2012.
CN Decision on Rejection for Application No. 200980136912.9, Aug. 1, 2013.
Kirshenbaum, "Using External Memory Devices to Improve System Performance", U.S. Appl. No. 10/970,772, filed Oct. 21, 2004.
Kirshenbaum, "Using External Memory Devices to Improve System Performance", U.S. Appl. No. 12/366,112, filed Feb. 5, 2009.
Kirshenbaum, "Using External Memory Devices to Improve System Performance", U.S. Appl. No. 12/775,168, filed May 6, 2010.
Kirshenbaum, "Using External Memory Devices to Improve System Performance", U.S. Appl. No. 13/187,757, filed Jul. 21, 2011.
Fortin, "Apparatus and Method to Decrease Boot Time and Hibernate Awaken Time of a Computer System", U.S. Appl. No. 10/186,164, filed Jun. 27, 2002.
Sechrest, "Methods and Mechanisms for Proactive Memory Management", U.S. Appl. No. 10/325,591, filed Dec. 20, 2002.
CN Notice on First Office Action for Application No. 200510083792.4, Feb. 1, 2008.
CN The Second Office Action for Application No. 200510083792.4, Jun. 27, 2008.
JP Notice of Rejection for Application No. 2005-135274, Sep. 24, 2010.
JP Notice of Rejection for Application No. 2005-135274, Sep. 9, 2011.
EP Communication for Application No. 05 103 697.8-2201, May 21, 2007.
EP Communication for Application No. 05 103 697.8-2201, Oct. 26, 2007.
EP Communication for Application No. 05 103 697.8-2201, Jun. 17, 2008.
EP Communication for Application No. 05 103 697.8-2201, Nov. 7, 2008.
EP Communication for Application No. 03 022 573.4-1229, Aug. 2, 2007.
EP Communication for Application No. 03 022 573.4-1229, Nov. 8, 2007.
EP Communication for Application No. 03 022 573.4-1229, Oct. 6, 2008.
Ergan, "Non-Volatile Memory Cache Performance Improvement", U.S. Appl. No. 10/837,986, filed May 3, 2004.
JP Notice of Rejection for Application No. 2005-306948, Mar. 11, 2011.
JP Notice of Reasons for Rejection for Application No. 2008-545888, Apr. 19, 2012.
EP Provision of the Minutes of the Oral Proceedings for Application No. 05 109 295.5-2201, Aug. 7, 2012.
EP Supplementary Search Report for Application No. 06 839 426, Search Completed May 4, 2009.
EP Decision to Refuse a European Patent Application for Application No. 05 109 295.5-2201, Aug. 7, 2012.
JP Notice of Reasons for Rejection for Application No. 2008-545888, Aug. 29, 2012.
Larsen, "Improve Programming Performance with Intel® Flash Memory Enhanced Factory Programming," Intel Corporation, May 9, 2006.
Motoazabu, "IEEE 1394: A Dream Interface at the Turning Point", PC User, Oct. 24, 1999, pp. 2-6, with partial translation.
SanDisk, "Optimization of CF Host Operation," SanDisk® Corporation, Feb. 28, 2005.
Spansion, "Optimizing Program/Erase Times," Sep. 2, 2004.
PCT International Search Report and Written Opinion for Application No. PCT/US2006/048402, May 8, 2007.
RU Official Action for Application No. 2003129662, Sep. 11, 2007.
Anderson, "A Case for Buffer Servers", Mar. 30, 1999.
Fortin, "External Memory Devices (EMD)", Jun. 17, 2004.
Fox, "Invention: The Phantom Car", NewScientist.com, Aug. 17, 2005.
EP Communication for Application No. 05109295.5-2201, Jun. 8, 2007.
CN Notice on First Office Action for Application No. 200510116208.0, Jun. 6, 2008.
CN The First Office Action for Application No. 200680047384.6, Jan. 22, 2010.
CN Decision on Rejection for Application No. 200680047384.6, Nov. 11, 2010.
EP Summons to Attend Oral Proceedings for Application No. 05 109 295.5-2201/1650666, Mar. 8, 2012.
EP Communication for Application No. 05 109 295.5-2201, Oct. 28, 2008.
EP Communication for Application No. 05 109 295.5-2201, Jan. 28, 2008.
JP Final Rejection for Application No. 2005-306948, Jan. 13, 2012.
KR The Notice of Final Rejection for Application No. 10-2005-0099666, Nov. 26, 2012.
KR The Notice of Preliminary Rejection for Application No. 10-2005-0099666, Apr. 30, 2012.
AU Examiner's First Report for Application No. 2005219500, May 31, 2010.
TW Search Report for Application No. 094114140, Nov. 22, 2011.
JP Notice of Rejection for Application No. 2005-134492, Jan. 25, 2011.
"Computervision Launches Design Automation Development Platform for Windows, UNIX Desktop Applications", Jan. 10, 1995.
"Developer's Guide to Apple Data Detectors—For Version 1.0.2", Apple Computer Inc., Dec. 1, 1997.
"Mechanical Design Software (Buyers Guide)", Computer-Aided Engineering, Dec. 1993, pp. 32, 34-35 and 38.
Oracle 9i SQL Reference—SQL Statements: Create Cluster to Create Java, 10 of 12, Oct. 2002.
Anderson, "Referential Integrity Implementation Details and Advantages", IBM Technical Disclosure Bulletin, Mar. 1995.
Andrews, "Combining Language and Database Advances in an Object-Oriented Development Environment", Conference on Object Oriented Programming Systems Languages and Applications, Oct. 4-8, 1987.
Ballard, "Improved Recovery from Partial Page Writes of Data Pages", IBM Technical Disclosure Bulletin, May 1993.

(56) References Cited

OTHER PUBLICATIONS

Beard, "Multilevel and Graphical Views of Metadata", Fifth International Forum on Research and Technology Advances in Digital Libraries, Apr. 22-24, 1998.
Beitner, "Multimedia Support and Authoring in Microcosm: An Extended Model", 1994.
Berg, "How Do I Create Persistent Java Objects?", Dr. Dobb's Journal, Apr. 1997.
Bhattacharya, "Coordinating Backup/Recovery and Data Consistency Between Database and File Systems", International Conference on Management of Data, Jun. 4-6, 2002.
Biliris, "The Performance of Three Database Storage Structures for Managing Large Objects", Proceedings of the International Conference on Data Engineering, Jun. 2-5, 1992.
Booch, "Object-Oriented Analysis and Design with Applications", Sep. 30, 1993, pp. 155-156, 179-183.
Bracchi, "Binary Logical Associations in Data Modelling", Proceedings of the IFIP Working Conference on Modelling in Data Base Management Systems, Jan. 5-8, 1976.
Bullock, "Recovery of Data Pages After Partial Page Writes", IBM Technical Disclosure Bulletin, Aug. 1, 1991.
Buneman, "Inheritance and Persistence in Database Programming Languages", International Conference on Management of Data, Jan. 1986.
Cammarata, "Extending a Relational Database with Deferred Referential Integrity Checking and Intelligent Joins", Jun. 1989.
Chien, "Concurrent Aggregates (CA): Design and Experience with a Concurrent Object-Oriented Language Based on Aggregates", Journal of Parallel and Distributed Computing, Mar. 1995.
Chryssostomidis, "Geometric Modeling Issues in Computer Aided Design of Marine Structures", Marine Technology Society Journal, Dec. 1988.
Ciccozzi, "Computer Dictionary", Microsoft Press, Aug. 1, 1997, pp. 39-40.
D'Andrea, "UniSQL's Next-Generation Object-Relational Database Management System", Sep. 1996.
Darby, "Object Serialization in Java 1.1 Making Objects Persistent", WEB Techniques, Sep. 1997.
Dietrich, "TGMS: An Object-Oriented System for Programming Geometry", Feb. 15, 1989.
Dobashi, "Skylight for Interior Lighting Design", Computer Graphics Forum, Aug. 1994.
Dorsch, "Accel Signs with IBM to Buy Altium PCB Unit—Accel Technologies Acquires the Assets to Altium's P-CAD Business Unit", Jan. 16, 1995.
EP Partial Search Report for Application No. 05 10 3690, Apr. 14, 2008.
Fegaras, "Optimizing Object Queries Using an Effective Calculus", ACM Transactions on Database Systems, Dec. 2000.
Findler, "Contract Soundness for Object-Oriented Languages", Conference on Object-Oriented Programming Systems Languages and Application, Nov. 2001.
Foley, "Computer Graphics: Principles and Practices", Jun. 15, 1990, Chpt. 5, pp. 201-227.
Friis-Christensen, "Requirements and Research Issues in Geographic Data Modeling", Proceeding of the Ninth International Symposium on Advances in Geographic Information Systems, Nov. 9-10, 2001.
Fuh, "Implementation of SQL3 Structured Types with Inheritance and Value Substitutability", Proceedings of the 25th VLDB Conference, Sep. 7-10, 1999.
Garret, "An Object-Oriented Environment for Representing Building Design and Construction Data", Jun. 1989, Final Report, pp. 2-34, even pages only.
Goscinski, "Distributed Operating Systems: The Logical Design", Aug. 1991, pp. 306-313.
Harrison, "Structure Editors: User-Defined Type Values and Type Inference", International Conference on Software Methods and Tools, Nov. 6-9, 2000.
Haverlock, "Object Serialization, Java, and C++", Dr. Dobb's Journal, Aug. 1, 1998.
Hay, "Data Model Patterns: Conventions of Thought", Jan. 1, 1996, Chpt. 4, pp. 46-67, Chpt. 12, pp. 235-259.
Hernandez, "The Merge/Purge Problem for Large Databases", Proceedings of the International Conference on Management of Data, May 1995.
Hsiao, "DLFM: A Transactional Resource Manager", Proceedings of the International Conference on Management of Data, Dec. 14-16, 2000.
Kaneko, "Design of 3D CG Data Model of 'Move' Animation Database System", Proceedings of the Second Far-East Workshop on Future Database Systems, Apr. 26-28, 1992.
Kaneko, "Towards Dynamics Animation on Object-Oriented Animation Database System 'Move'", Proceedings of the Third International Symposium on Database Systems for Advanced Applications, Apr. 6-8, 1993.
Katz, "Toward a Unified Framework for Version Modeling in Engineering Databases", Dec. 1990.
Kawabe, "A Framework for 3D Modeling: Constraint-Based Description and Non-Manifold Geometric Modeling", A Collection of Contributions Based on Lectures Presented at the Second Toyota Conference, Oct. 2-5, 1988.
Kempfer, "CAD Jumps on Windows 3.1 Bandwagon", Computer Aided Engineering, Nov. 1993.
Khan, "A Performance Evaluation of Storing XML Data in Relational Database Management Systems", Nov. 9, 2001.
Khoshafian, "Object Identity", Conference on Object-Oriented Programming Systems Languages and Application, Sep. 1986.
Kiesling, "ODBC in UNIX Environments: A Database Standard that Really is Platform Independent", Dr. Dobb's Journal, Dec. 2002.
King, "TriStarp—An Investigation in the Implementation and Exploitation of Binary Relational Storage Structures" Proceedings of the Eighth British National Conference on Data Bases, Jul. 9-11, 1990.
Krouse, "Geometric Models for CAD/CAM", Jul. 24, 1980, Machine Design, pp. 99-106.
Leblanc, "Design Data Storage and Extraction Using Objects", Concurrent Engineering: Research and Applications, Sep. 3, 1992.
Leontiev, "On Type Systems for Object-Oriented Database Programming Languages", Dec. 2002, pp. 409-449.
Levy, "Incremental Recovery in Main Memory Database Systems", IEEE Transactions on Knowledge and Data Engineering, Dec. 1992.
Lim, "Transaction Processing in Mobile, Heterogeneous Database Systems", IEEE Transactions on Knowledge and Data Engineering, Nov. 2002.
Mallet, "Myrtle: A Set-Oriented Meta-Interpreter Driven by a 'Relational' Trace for Deductive Databases Debugging", Jan. 1999.
Marian!, "Oggetto: An Object Oriented Database Layered on a Triple Store", The Computer Journal, Apr. 1992.
McMahon, "SED—A Non-Interactive Text Editor", Aug. 15, 1978.
Melton, "SQL and Management of External Data", Mar. 2001, pp . 1-8.
Mitchell, "The Logic of Architecture: Design, Computation, and Cognition", Apr. 1990, pp. 138-143.
Navathe, "Evolution of Data Modeling for Databases", Communications of the ACM, Sep. 1992.
Nelson, "Generic Support for Caching and Disconnected Operation", Fourth Workshop on Workstation Operating Systems, Oct. 14-15, 1993.
Nijssen, "Conceptual Schema and Relational Database Design, a Fact Oriented Approach", Aug. 1989, Chapters 2, 3 and 7.
Orenstein, "Query Processing in the ObjectStore Database System", International Conference on Management of Data, Jun. 1992.
Ottogalli, "Visualisation of Distributed Applications for Performance Debugging", Jan. 2001.
Pachet, "A Combinational Approach to Content-Based Music Selection", Proceedings of the IEEE Multimedia Computing and Systems International Conference, Jul. 1999.
Papiani, "A Distributed Scientific Data Archive Using the Web, XML, and SQL/MED", Sep. 1999.
Ponnekanti, "Online Index Rebuild", International Conference on Management of Data, May 16-18, 2000.

(56) References Cited

OTHER PUBLICATIONS

Powell, "Objects, References, Identifiers and Equality White Paper", Sun Microsystems, Jul. 2, 1993.
Prosise, "2-D Drafting: Why Pay More?", PC Magazine, Feb. 23, 1993.
Ramsey, "An Algebraic Approach to File Synchronization", Eighth European Software Engineering Conference, Sep. 10-14, 2001.
Read, "Developing the Next Generation Cockpit Display System", IEEE National Aerospace and Electronics Conference, May 20-23, 1996.
Reiner, "Benefits of X-Based Three-Tier Client/Server Model with ESRI Applications", Virtual Solutions, 1995.
Rosenblum, "The Design and Implementation of a Log-Structured File System", Proceedings of the Thirteenth ACM Symposium on Operating Systems Principles, Jul. 24, 1991.
Rouse, "CAD Pioneers are Still Trailblazing", Machine Design, Oct. 22, 1987.
Roussopoulos, "Using Semantic Networks for Data Base Management", Proceedings of the First International Conference on Very Large Data Bases, Sep. 1975.
Santos, "Computer Aided Mechanical Engineering Design Environment for Concurrent Design Process", Proceedings of the ITEC Workshop on Concurrent Engineering, May 4-6, 1993.
Seshadri, "Enhanced Abstract Data Types in Object-Relational Databases", The International Journal on Very Large Databases, Aug. 1998.
Simoes, "A RISC-Microcontroller Based Photovoltaic System for Illumination Applications", Fifteenth Annual IEEE Applied Power Electronics Conference and Exposition, Feb. 6-10, 2000.
Simon, "Strategic Database Technology: Management for the Year 2000", Apr. 28, 1995.
Singhal, "DDB: An Object Oriented Design Data Manager for VLSI CAD", Proceedings of the International Conference on Management of Data, May 26-28, 1993.
Sreekanth, "A Specification Environment for Configuring a Discrete-Part Manufacturing System Simulation Infrastructure", International Conference on Systems, Man and Cybernetics, Oct. 17-20, 1993.
Stevens, "Value in 3-D", Jan. 8, 1995.
Stonebraker, "The Case for Partial Indexes", Dec. 1989, SIGMOD Record, vol. 18, No. 4, pp. 4-11.
Strickland, "Intersection of Relational and Object", Proceedings of the AM/FM International Conference, Mar. 14-17, 1994.
Sutherland, "The Hybrid Object-Relational Architecture (HORA): An Integration of Object-Oriented and Relational Technology", Proceedings of the ACM/SIGAPP Symposium on Applied Computing, Feb. 14-16, 1993.
Suzuki, "Geometric Modeling for Modeling Products", Proceedings of the Third International Conference on Engineering Graphics and Descriptive Geometry, Jul. 11-16, 1988.
Taylor, "An Integrated Robot System Architecture", Jul. 1983, Proceedings IEEE, vol . 71, No. 7, pp. 842-856.
Varlamis, "Bridging XML-Schema and Relational Databases. A System for Generating and Manipulating Relational Databases Using Valid XML Documents", Nov. 9-10, 2001.
Watanabe, "Knowledge Integration for Architectural Design", 1994.
Waugh, "Specifying Metadata Standards for Metadata Tool Configuration", Proceedings of the Seventh International World Wide Web Conference, Apr. 14-18, 1998.
Wilcox, "Object Databases—Object Methods in Distributed Computing", Dr. Dobbs Journal, Nov. 1994.
Wold, "Content-Based Classification, Search, and Retrieval of Audio", 1996.
Yoshikawa, "XRel: A Path-Based Approach to Storage and Retrieval of XML Documents Using Relational Databases", Aug. 2001.
CN Notice on the First Office Action for Application No. 200960136912.9, Jan. 14, 2013.
CN Notice on the Second Office Action for Application No. 200960137190.9, Mar. 20, 2013.
Iyigun, "Management of Cache Data and Metadata", U.S. Appl. No. 61/097,079, filed Sep. 15, 2008.
CN Notice on the Third Office Action for Application No. 200980137190.9, Aug. 1, 2013.
JP Notification of Reason(s) for Refusal for Application No. 2012-111004, Nov. 19, 2013.
JP Decision to Decline the Amendment for Application No. 2005-135274, Jul. 3, 2012.
JP Final Rejection for Application No. 2005-135274, Jul. 3, 2012.
JP Notice of Rejection for Application No. 2012-243915, Jul. 9, 2013.
IN First Examination Report for Application No. 1086/DEL/2005, Sep. 10, 2013.
CN Office Action for Application No. 200980145878.1, Apr. 4, 2014.
JP Notice of Reason for Rejection for Application No. 2011-526951, Jul. 11, 2014.
JP Final Notification of Reason(s) for Refusal for Application No. 2012-243915, Mar. 25, 2014.
KR Final Notice of Preliminary Rejection for Application No. 10-2008-7014092, Nov. 28. 2013.
JP Notice of Rejection for Application No. 2003-347507, Mar. 26, 2010.
CA Office Action for Application No. 2,442,188, Mar. 10, 2010.
AU Examiner's first report on patent application No. 2003243990, Jan. 23, 2009.
KR Notice of Preliminary Rejection for Application No. 10-2003-69015, Nov. 30, 2009.
MX Office Action for Application No. PA/a/2003/008766, Jul. 28, 2007.
EP Communication for Application No. 03 022 573.4-1229, Jul. 14, 2010.
CA Office Action for Application No. 2,723,077, Jan. 9, 2013.
AU Examiner's first report on patent application No. 2010201717, Jun. 28, 2011.
KR Notice of Preliminary Rejection for Application No. 10-2008-7014092, May 30, 2013.
EP Result of consultation for Application No. 05 109 295.5-2201, Jun. 12, 2012.
EP Result of consultation for Application No. 05 109 295.5-2201, Jun. 15, 2012.
EP Communication for Application No. 06 839 426.1-1229, Sep. 2, 2011.
EP Communication for Application No. 06 839 426.1-1229, Oct. 28, 2011.
PCT International Search Report and Written Opinion for Application No. PCT/US06/26373, May 11, 2007.
MY Adverse Report for Application No. PI 20081667, Aug. 30, 2013.
Haining, "Non-Volatile Cache Management for Improving Write Response Time with Rotating Magnetic Media", Sep. 2000, Dissertation, Univ. of Calif. Santa Cruz.
CA Office Action for Application No. 2,523,761, Feb. 26, 2014.
JP Notice of Reasons for Rejection for Application No. 2011-526951, Dec. 16, 2013.

\* cited by examiner

METHOD AND SYSTEM FOR ENSURING RELIABILITY OF CACHE DATA AND METADATA SUBSEQUENT TO A REBOOT

RELATED APPLICATIONS

This application claims priority under 35 U.S.C. §119(e) to U.S. Provisional Patent Application Ser. No. 61/097,079, filed Sep. 15, 2008, entitled "Management of Cache Data and Metadata," the entirety of which is incorporated herein by reference.

FIELD OF THE INVENTION

This invention relates to techniques for employing non-volatile memory devices, such as removable and non-removable non-volatile random access memory (NVRAM) devices.

BACKGROUND

Some conventional operating systems provide a capability to employ a non-volatile memory device (i.e., a peripheral device operable to provide auxiliary storage and/or memory to a computer, such as a flash memory universal serial bus (USB) drive) as a block or file-level cache for slower storage devices (e.g., a disk storage medium, or one or more storage devices accessible via a network), to improve the performance of the operating system and/or applications. In this respect, because read and write operations can be performed significantly faster from or to a non-volatile memory device (hereinafter referred to as a "cache device" for simplicity) than from or to a slower storage device, using a cache device to cache data stored on such a slower device offers opportunities to significantly improve the speed of input/output (I/O) operations of operating systems and/or applications. To this end, the Microsoft Windows® Vista operating system, produced by Microsoft® Corporation of Redmond, Wash., includes a feature known as ReadyBoost which allows users to employ cache devices to cache data also residing in a slower storage device (referred to hereinafter as "disk storage" or "disk" for convenience, although it should be understood that these terms refer generally to any storage mechanism(s) and/or device(s) to which I/O is typically performed more slowly than a cache device, including storage devices accessible via a network).

Employing a cache device to cache data stored on disk may be accomplished using a cache manager component, which in some implementations is a driver implemented in the operating system's I/O stack. FIGS. 1A-1B depict example high-level processes 10A-10B whereby a cache manager component 100 manages the caching of data to cache device 110. Cache device 110 may be coupled, using wired and/or wireless communications infrastructure and protocol(s), to a computer (not shown) on which cache manager 100 resides. For example, cache device 110 may be removable from the computer (e.g., comprise a flash memory USB drive), non-removable and/or accessible to the computer via one or more wired and/or wireless networks.

At the start of the process 10A (FIG. 1A), a write request is received by cache manager 100 specifying that data should be written to address X on disk storage (i.e., cached volume 120). Cache manager 100 processes the request by causing the data to be written to address X on cached volume 120 in operation 101, and also to address Y on cache device 110 in operation 102. Process 10B (FIG. 1B) includes operations performed thereafter when a read request is received specifying that the data stored at address X on cached volume 120 should be read. Cache manager 100 determines that the data is cached on cache device 110 at address Y, and causes the data at address Y to be read in operation 103. The data is then served from the cache device to satisfy the read request in operation 104.

The cache manager maintains a mapping of disk addresses (e.g., address X) to corresponding cache addresses (e.g., address Y) in metadata, and this "cache metadata" is usually employed in reading from or writing to the cache device. Typically, cache metadata is maintained in memory and accessed by the cache manager when I/O requests are received. As such, when a read request is received by the cache manager which is directed to disk offset X, the cache manager uses the cache metadata to determine that the data is also stored at cache offset Y, and to satisfy the request by causing the data to be read from cache offset Y rather than disk offset X. When a write request is received by the cache manager which is directed to disk offset X, the cache manager employs the cache metadata to determine whether the data at that disk address is also stored in cache. If so (e.g., if the data is stored at cache address Y), the cache manager may cause the data to be written to the appropriate address in cache, or evict the cache contents at that address. If not, the cache manager may cause the data to be written to cache, and may update the cache metadata so that future reads to disk offset X may instead be serviced from the data stored on cache.

Conventional operating systems are capable of supporting cache devices with relatively limited storage capacity. For example, the ReadyBoost feature of the Microsoft Windows® Vista operating system supports cache devices with up to a four gigabyte storage capacity. (At the time Microsoft Windows® Vista was released, the maximum storage capacity of cache devices was approximately two gigabytes). The storage capacity of cache devices has grown rapidly in recent years, with some cache devices providing a storage capacity of up to sixteen gigabytes, which may store the equivalent of thirty-two gigabytes of data when compressed.

SUMMARY OF THE INVENTION

Applicants have appreciated that cache devices having relatively larger storage capacity offer significant opportunity to improve the speed of I/O operations performed by operating systems and applications. Applicants have also appreciated that one reason conventional operating systems support cache devices with only relatively limited storage capacity is that cache contents must be repopulated when certain types of power transitions (e.g., standby, hibernate (or equivalent modes used by non-Microsoft Windows® operating systems), or reboot) occur. With cache devices that have relatively larger storage capacity, repopulating cache contents can take considerable time and consume significant processing resources. As an example, an eight gigabyte flash memory device, which may hold up to sixteen gigabytes of compressed data, may take up to thirty minutes to repopulate using background I/O from disk at approximately ten megabytes per second. This not only effectively negates any performance benefits that might have been gained by employing the cache device, but indeed may significantly slow system operations.

One reason cache contents must be repopulated across certain power transitions is that there is no way to reliably ensure that cache contents accurately represent the contents of disk storage when the computer is restarted, because the contents of the cache device and/or the disk may have been modified during the power transition. For example, when a first computer is shut down, a hacker could disconnect a removable cache device, connect it to another computer, and modify the cache contents, so that if the device were then reconnected to the first computer, incorrect data (hereinafter referred to as "inauthentic" data) could be served from the cache device to satisfy I/O requests. In addition to a hacker's malicious acts, cache contents might also become corrupted during a power transition due to a hardware failure of the computer or cache device.

Cache contents may also become "stale" during a power transition because data on disk was updated during the transition, so that when the computer is restarted, the cache contents may no longer accurately represent disk contents. For example, after shutdown a user might boot the disk into another operating system that does not recognize the cache device and modify data stored on the disk that is cached on the cache device, so that when the computer is restarted the cache contents no longer reflect what is stored on the disk. In another example, certain operations on a computer during shutdown might occur after the cache device is rendered inaccessible to the operating system (e.g., after the cache device is turned off), so that any writes to disk performed by the operating system subsequent to this point in time may not be accurately reflected by cache contents. Any of numerous events may cause cache contents to become stale across a power transition.

Embodiments of the present invention provide techniques for managing these and other concerns, so that cache contents may be relied upon as accurately reflecting data stored on disk across a power transition. For example, some embodiments of the invention provide techniques for verifying that cache contents remain authentic across a power transition. In addition, some embodiments provide techniques for reliably ensuring that cache contents do not become stale across a power transition. Further, some embodiments provide techniques for managing cache metadata across power transitions as well as during normal ("steady state") operations, ensuring that the cache metadata may be efficiently accessed and reliably saved and restored when a power transition occurs.

By providing techniques which ensure that cache contents can be relied upon as accurately reflecting data stored on disk across power transitions, some embodiments of the invention may enable a cache device with substantial storage capacity to be employed to significantly speed up I/O operations performed by the operating system and/or applications. The increased speed of I/O operations may not only expedite normal, "steady state" operations of the computer, but also significantly speed up operations performed during boot, so that the computer is ready for use much more quickly.

In some embodiments, a method is provided for operating a computer having coupled thereto a storage medium and a cache device, the computer comprising an operating system. The method comprises acts of: (A) in response to a request to write a data item to an address on the storage medium, causing the data item to be written to the address on the storage medium and to a corresponding address on the cache device; (B) subsequent to a reboot of the operating system, determining whether the data item stored at the address on the cache device can reliably be employed to satisfy a request to read the data item from the address on the storage medium; and (C) if it is determined in (B) that the data item stored at the address on the cache device can reliably be employed to satisfy a request to read the data item from the address on the storage medium, causing the data item to be read from the address on the cache device.

Other embodiments provide at least one computer storage medium having stored thereon instructions which, when executed by a computer comprising an operating system and having coupled thereto a cache device, perform a method comprising acts of: (A) in response to a request to write a data item to an address on the computer storage medium, causing the data item to be written to the address on the computer storage medium and to a corresponding address on the cache device; (B) subsequent to a reboot of the operating system and in response to a request to read the data item from the address on the computer storage medium, determining whether the data item stored at the address on the cache device was modified after (A); and (C) if it is determined in (B) that the data item stored at the address on the cache device was not modified after (A), causing the data item to be read from the address on the cache device.

Still other embodiments provide a computer, comprising: a storage medium having at least one address at which data is stored; a cache device having at least one address at which data is stored; at least one processor programmed via an operating system to: in response to a request to write a data item to a first address on the storage medium, cause the data item to be written to the first address on the storage medium and to a corresponding address on the cache device; identify an occurrence of a write operation to an address on the storage medium which is not also performed to an address on the cache device; and determine, subsequent to a reboot of the operating system, whether the data item stored at the corresponding address on the cache device can reliably be used to satisfy a request to read the data item from the first address on the storage medium, by determining whether a write operation was performed to the first address on the storage medium which was not also performed to the corresponding address on the cache device.

DETAILED DESCRIPTION

Figure 1A:
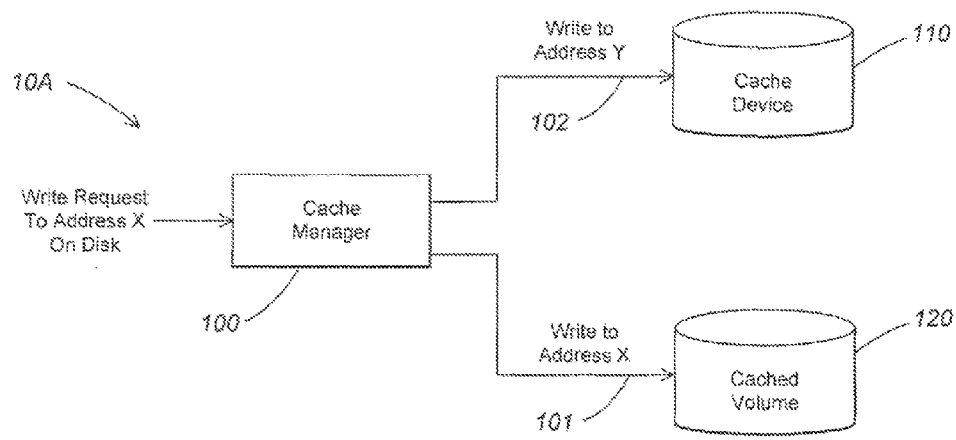
FIGS. 1A-1B are block diagrams depicting techniques for writing to and reading from a cache device, in accordance with the prior art.
Figure 1B:
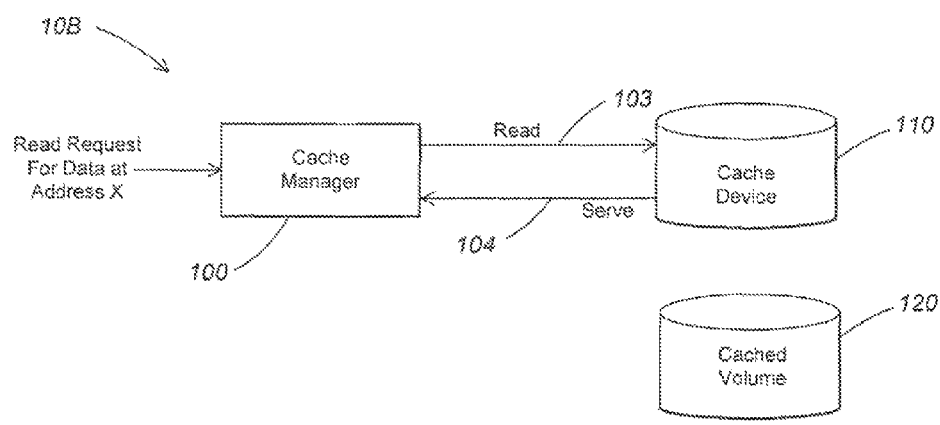

Some embodiments of the invention provide techniques for ensuring that cache contents accurately reflect the contents of disk storage across a power transition. For example, some embodiments provide a capability for ensuring that cache contents remain authentic and/or have not become stale across the power transition. Further, some embodiments provide techniques for managing cache metadata, to ensure that metadata has not been tampered with during a power transition. In addition, some embodiments provide a capability for storing cache metadata which may improve the efficiency with which both power transitions and normal operations may be performed. The sections that follow describe these embodiments in detail.

I. Verifying Cache Data Authenticity

When a computer experiences a power transition (e.g., is taken into standby or hibernate mode, or is rebooted), a cache device may be disconnected from the computer, and its contents may be altered (e.g., by a malicious hacker). For example, when a computer is brought into standby or hibernate mode, a removable cache device such as a flash memory drive, may be disconnected from the computer and its contents modified. Even non-removable devices such as internal NVRAM devices may be disconnected and their contents changed when the operating system is rebooted (i.e., reloaded, thereby restarting the computer). As a result, when the cache device is reconnected to the computer, it may store different information than the user believes (i.e., the data stored in cache may not be "authentic"). If inauthentic data is served from cache to satisfy an input/output (I/O) request, the computer's operation could be negatively affected.

Some embodiments of the invention provide techniques for detecting modifications that occur to cache contents during a power transition, to ensure that I/O requests are not satisfied using inauthentic data from cache. In some embodiments, a capability is provided to detect any "offline modifications" which occur to cache contents during a power transition which render them inauthentic.

Some embodiments provide this capability using a representation of at least a portion of the data. For example, a representation may be calculated or derived from at least a portion of the data and/or other information in a predetermined manner. The representation may be generated a first time when the data is written to cache, and stored at one or more locations. For example, representation may be written to cache along with the data, or to some other location(s). When stored to cache, the representation may be stored in a manner which associates the representation with the data (e.g., it may be written to a cache address adjacent that to which the data is written, written to cache metadata associated with the data, and/or associated in some other fashion). When the data is subsequently read from cache, the representation may also be retrieved. The representation may be re-generated in the predetermined manner, and the regenerated representation may be compared to the retrieved representation. If the representations match, the data retrieved from cache is determined to be authentic, and served to satisfy the read request. If not, a request is issued to read the data instead from disk storage to satisfy the read request, and the inauthentic data stored on cache may be evicted (e.g., deleted).

Figure 2A:
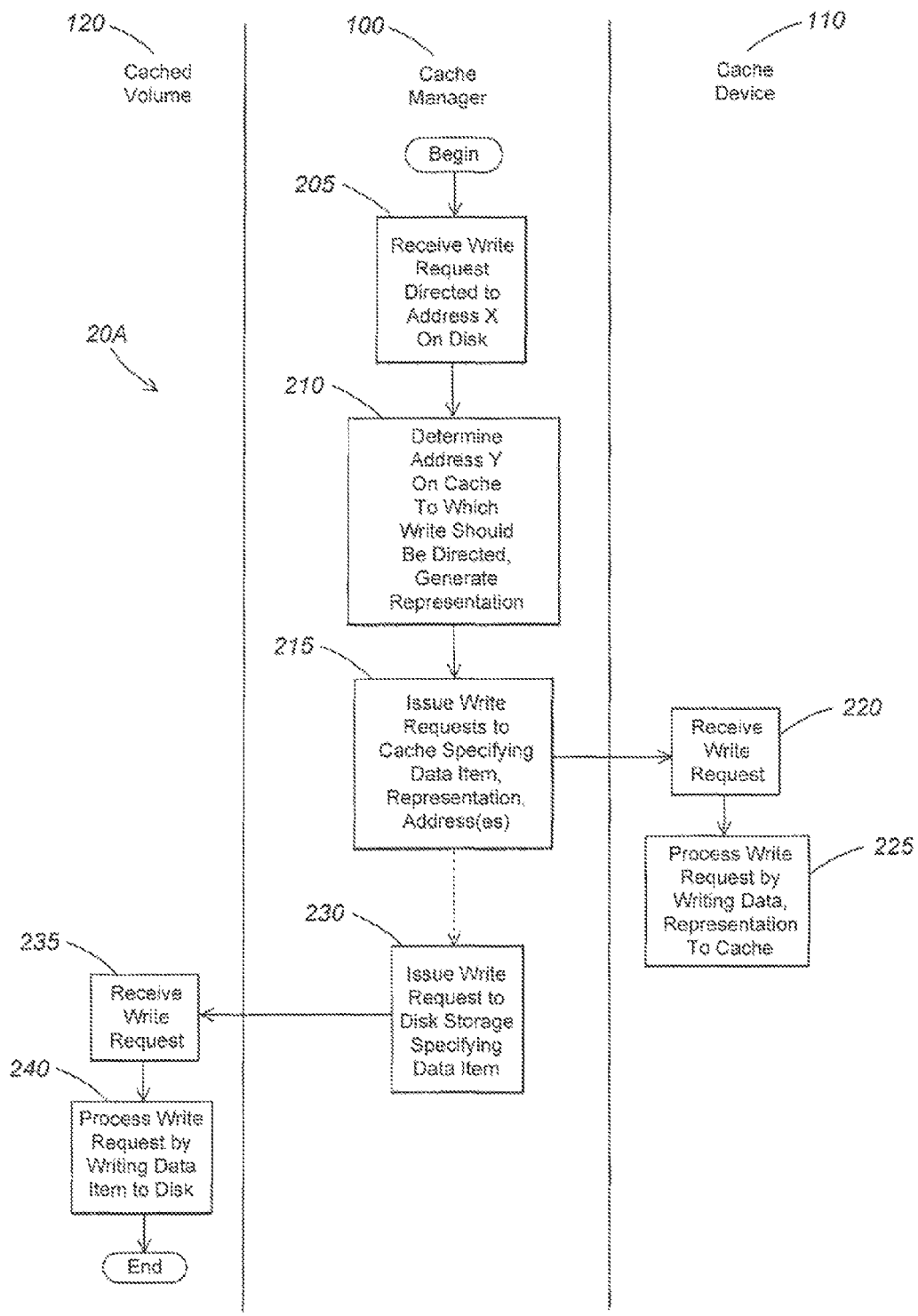
FIGS. 2A-2B depict exemplary techniques for writing to and reading from a cache device in accordance with some embodiments of the invention.
Figure 2B:
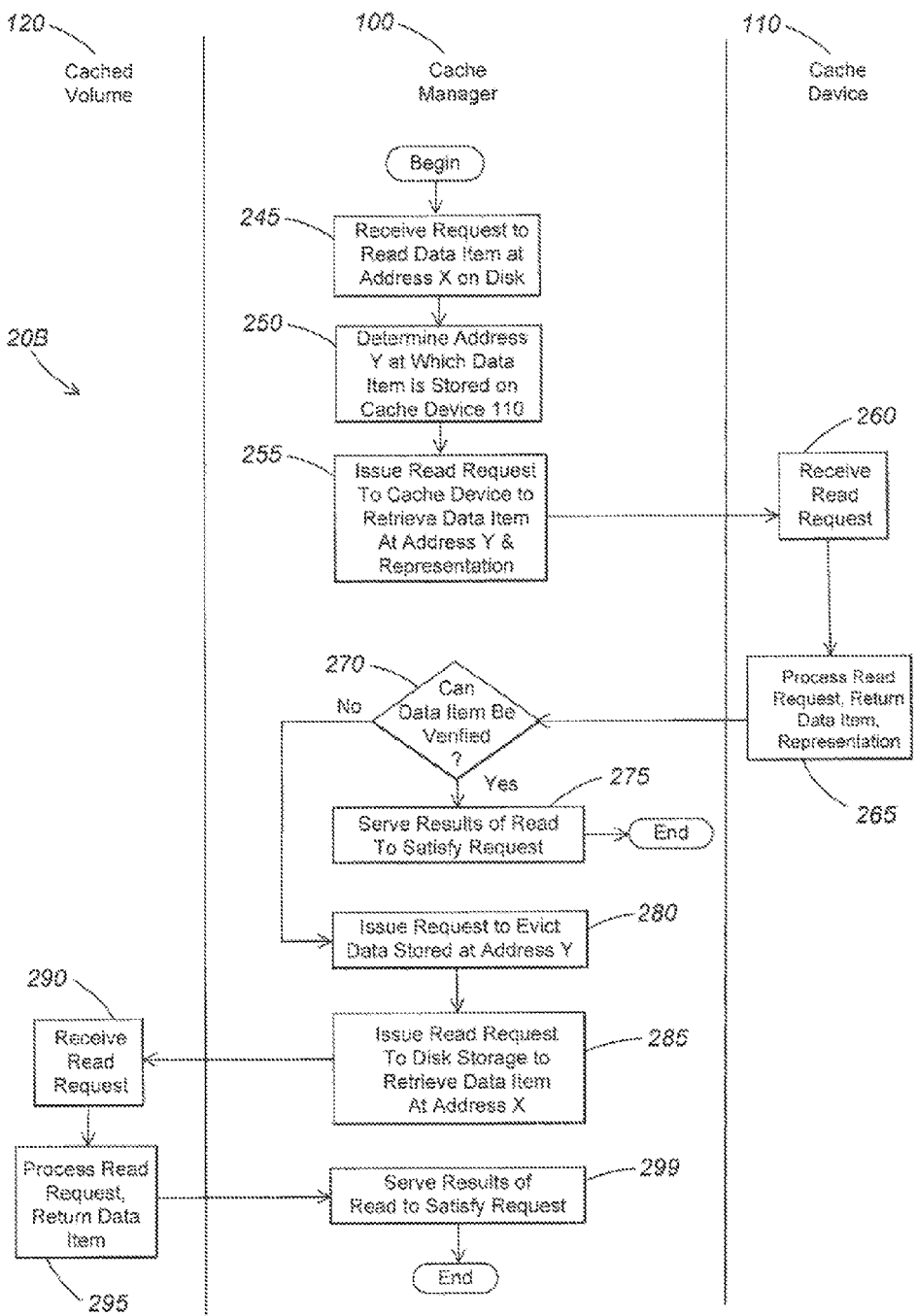

FIGS. 2A-2B depict this process in greater detail. In particular, process 20A shown in FIG. 2A includes operations performed when data is written to cache, and process 20B shown in FIG. 2B includes operations performed subsequently when the data is read from cache. Processes 20A-20B each include operations performed by cached volume 120 (on the left side of each figure), cache manager 100 (in the middle) and cache device 110 (on the right).

At the start of process 20A (FIG. 2A), a write request directed to address X on disk storage is received by cache manager 100 in act 205. In act 210, cache manager 100 employs cache metadata (not shown) to determine an address Y on cache device 110 to which the data should also be written. Cache manager also generates the representation of at least a portion of the data.

Embodiments of the invention may generate this representation using any suitable technique. In some embodiments, one or more cryptographic authentication techniques may be employed to generate the representation. For example, in some embodiments, the representation may comprise a message authentication code (MAC) generated from the data and a set of secret keys and per-data item sequence numbers. However, the invention is not limited to such an implementation, as any suitable technique for generating the representation may be employed. For example, cryptographic authentication techniques need not be employed. As an example, a strong hash and/or cyclic redundancy code (CRC) might alternatively be used to represent data, and may be generated from individual data items stored to cache, or for one or more groups of data items. In this respect, Applicants have appreciated that if the goal of verifying data authenticity were to merely detect instances of hardware corruption (i.e., hacking of data were not a concern), then using a CRC may be sufficient, and may consume less processing resources than generating a MAC for each data item. However, if the goal is to prevent a hacker or malicious actor from modifying cache contents, then a cryptographic solution may be preferable, so that a representation such as a MAC may be used. The invention is not limited to any particular implementation, as any suitable technique may be employed.

In act 215, cache manager 100 issues the request to cache device 110 to write the data to cache address Y. Cache manager also issues a request to cache device 110 to write the representation. For example, cache manager 100 may specify that the representation should be written to one or more locations adjacent to cache address Y, or be stored in cache metadata for the data, and/or using any other technique. As discussed above, the invention is not limited to writing the representation to any particular location (e.g., it need not be written to cache device 110). If written to cache, the representation may be associated with the data in any manner desired.

In act 220, cache device 110 receives the request and processes it by writing the data and the representation in act 225.

In act 230, cache manager 100 issues a corresponding request to cached volume 120 to write the data to disk address X. Cached volume 120 receives this request in act 235 and processes it by writing the data to address X in act 240. Although shown in FIG. 2A as being performed subsequent to the write to cache in acts 215-225, acts 230-240 may be performed in parallel with acts 215-225, or at any other suitable time(s), as the invention is not limited to any particular implementation. Process 20A then completes.

Process 20B (FIG. 2B) includes operations performed to read the data stored to cache. In act 245, cache manager 100 receives a request to read the data stored at address X on cached volume 120. Using cache metadata (not shown), cache manager 100 determines that the data is stored at address Y on cache device 110 in act 250. In act 255, cache manager 100 issues a read request to cache device 110 to retrieve both the data stored at address Y and the associated representation. The request is received by cache device 110 in act 260 and processed in act 265, whereupon cache device 100 returns the results to cache manager 100.

In act 270, cache manager 100 determines whether the data retrieved from cache can be verified. In some embodiments, this is done by re-generating the representation of the data, and comparing the regenerated representation with the representation originally generated in act 215. For example, act 270 may include regenerating a MAC or CRC for the data, and comparing it to the representation retrieved from cache in act 265.

If it is determined in act 270 that the representation can be verified, the process proceeds to act 275, wherein the data retrieved from cache device 110 is served to satisfy the read request, and process 20B then completes. If it is determined in act 270 that the representation can not be verified, the process proceeds to act 280, wherein cache manager 100 issues a request to cache device 110 to evict (e.g., erase or otherwise make inaccessible) the data stored at address Y. Cache manager 100 then issues a request to cached volume 120 to read the data from address X on disk in act 285. This request is received in act 290 and processed in act 295, whereupon the data is returned to cache manager 100. The data read from address X is then served to satisfy the read request in act 299. Process 20B then completes.

If a cryptographic solution for verifying data authenticity is employed, any key(s) used to generate a representation may be written to locations other than the cache device for the duration of the power transition, to prevent a hacker from gaining access to the keys to regenerate representations for altered data items. For example, in some embodiments, keys may be stored in disk storage (e.g., when the computer is shut down) to prevent unauthorized access. However, the invention is not limited to such an implementation, as keys need not be stored, and if stored, may reside in any suitable location. For example, stored keys may be placed in any configuration store provided by the operating system that is available during system boot (e.g., the system registry in Microsoft Windows®), or re-generated based on some user input (e.g., a password) so that no key storage is necessary.

It should be appreciated that the above-described embodiments for verifying the authenticity of a data item stored on a cache device are merely examples, and that authenticity may be verified using any suitable technique. For example, data item authenticity need not be verified by generating a representation of at least a portion of the data item when the data item is written which is later re-generated when the data item is read. Any suitable technique which reliably ensures that a data item read from cache is authentic and matches the data item previously written to cache may be employed. The invention is not limited to any particular implementation.

II. Preventing Cache Data Staleness

As discussed above, conventional operating systems are incapable of detecting when write operations are performed to data items stored on disk during power transitions which render cache contents stale. Some embodiments of the invention provide mechanisms for detecting when these "offline writes" occur, thereby ensuring that cache contents accurately reflect data stored on disk after a power transition occurs.

With some operating systems (e.g., the Windows® family of operating systems offered by Microsoft® Corporation), the semantics of certain power transitions (e.g., standby and hibernate modes) are such that data on non-removable storage devices (e.g., disk storage) can not be modified during a power transition. As such, the cache contents corresponding to data on such non-removable media generally do not become stale. However, when the computer is shut down, a number of things can happen which make it possible for data on disk to be modified. For example, a user may boot the disk into another operating system on that computer, or connect the disk to another computer, and modify data stored on disk. In addition, as discussed above, the mechanics of shutdown of many conventional operating systems are such that at some point during the shutdown, a cache device is turned off and is no longer accessible by the operating system, but the operating system may continue to access the disk. As such, the operating system may update data items on disk which are cached on the cache device. Because the cache device has been turned off, the operating system has no way of also updating these cache contents, so that they are rendered stale.

To manage these and other occurrences, some embodiments of the invention provide techniques for detecting modifications to data stored on disk after a shutdown is initiated, so that cache contents which are rendered stale by such modifications may be updated, evicted from cache, or otherwise handled.

To detect writes which are performed to disk storage during shutdown operations occurring after a cache device is shut off, some embodiments of the invention employ a write recorder component. A write recorder component may, for example, be implemented as a driver in the operating system's I/O path, although the invention is not limited to such an implementation. For example, a write recorder component may be hardware-based. As an example, disk storage hardware might provide one or more interfaces that provide the capability to identify the set of modifications that occurred during a certain time period, or whether modifications occurred during a certain time period. For example, disk storage hardware may provide a spin-up/power up/boot counter which may be employed to deduce that at least some stored data items have been updated, in which case cache contents corresponding to the data stored on disk may be evicted (this should not occur frequently, so employing the cache device should still deliver substantial benefits). The invention is not limited to any particular implementation.

In some embodiments, the write recorder component is configured to become active when shutdown is initiated, and to keep track of all writes performed to disk storage until shutdown completes. As a result, when the computer is later restarted, these writes may be applied to cache contents. For example, when the computer is restarted and disk volumes come online, the cache manager may then be started, and may begin tracking writes to disk. The cache manager may query the write recorder component to determine the offline writes that occurred after the cache device was shut off, merge these writes with those which the cache manager tracked during startup, and apply the merged set of writes to cache contents. Applying writes to cache contents may include, for example, updating the cache contents corresponding to the data on disk to which the writes were directed (e.g., performing the same write operations to these cache contents), evicting these cache contents, a combination of the two (e.g., applying write operations to certain cache contents and evicting others), or performing some other operation(s). After offline writes are applied to cache contents, the write recorder component may be shut down, and the cache device may begin servicing I/O requests.

Figure 3:
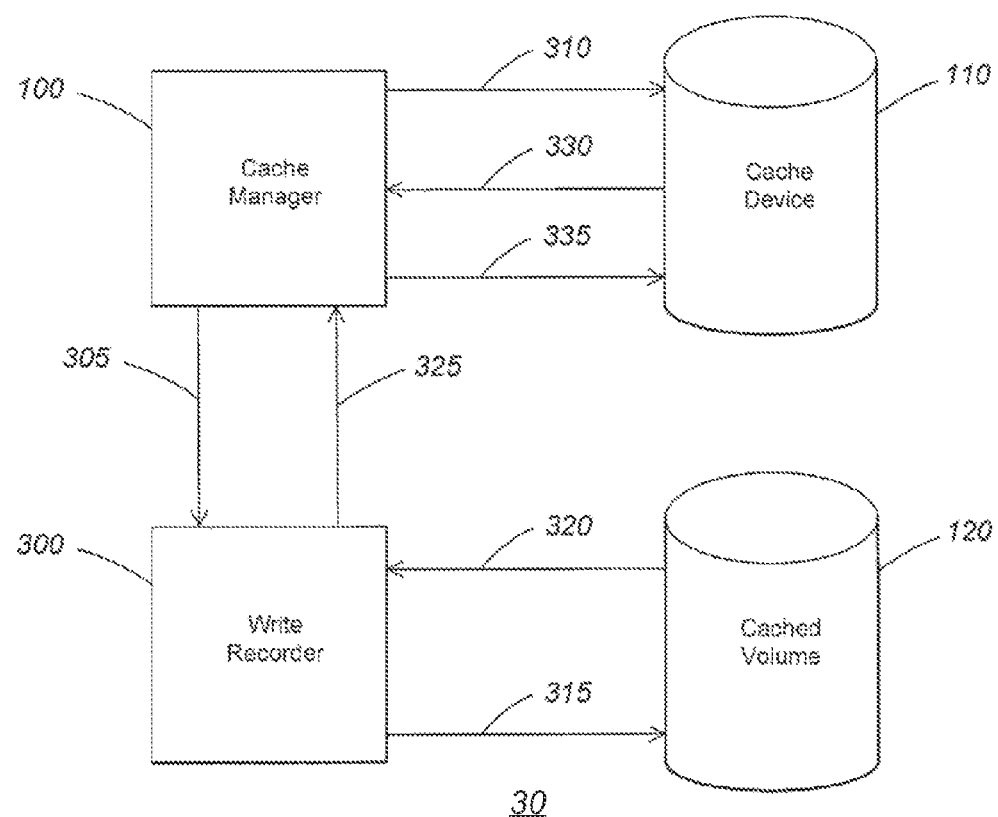
FIG. 3 is a block diagram depicting an exemplary technique for ensuring that cache data accurately reflects data stored on disk after a power transition, in accordance with some embodiments of the invention.

FIG. 3 depicts an example process 30 for tracking offline writes and applying these writes to cache contents. In particular, process 30 includes operations performed by cache manager 100, write recorder 300, cache device 110 and cached volume 120 during a computer's shutdown and subsequent reboot.

In act 305, which occurs during computer shutdown, cache manager 100 activates write recorder 300 and supplies to it a "persistence identifier" which identifies the set (i.e., generation) of write operations to be tracked by the write recorder. (Examples of the uses for a persistence identifier are described in detail below.) In act 310, cache manager 100 writes the persistence identifier, as well as cache metadata stored in memory, to cache device 110. At this point in the shutdown process, cache device 110 is turned off and becomes inaccessible to cache manager 100.

In act 315, write recorder 300 writes the persistence identifier passed to it in act 305 to cached volume 120, and begins tracking any write operations performed to cached volume 120 during shutdown. For example, write recorder 300 may create a log file, or one or more other data structures, on cached volume 120 or at some other location(s) to indicate the addresses on disk to which write operations are performed, and/or the data written to those addresses. At the completion of act 315, the computer's shutdown operations have finished.

Thereafter, the computer is restarted. As part of the boot process, cached volume 120 is brought online, write recorder 300 and cache manager 100 are restarted. Cache manager 100 may then begin tracking write operations performed to cached volume 120. For example, cache manager 100 may create a log file and store it on cache device 110, cached volume 120, and/or the computer's memory (not shown in FIG. 3). In act 320, write recorder 300 reads the volume changes logged in act 315, as well as the persistence identifier written to cached volume 120 in act 315. The volume changes and persistence identifier are then passed to cache manager 100 in act 325.

It should be appreciated that write recorder 300 may be incapable of tracking of all writes to disk after cache device 110 has turned off. For example, hardware data corruption, untimely power failures and/or problems in writing the log file may render write recorder 300 incapable of tracking all offline writes performed to a disk volume. In such cases, write recorder 300 may indicate to cache manager 100 in act 325 that it can not reliably determine that the log is a complete and accurate record of all offline writes performed. If this occurs, cache manager 100 may evict the entire cache contents, or a portion thereof (e.g., corresponding to a particular disk volume for which the write recorder could not track all write operations), as potentially being unreliable. The remainder of the description of FIG. 3 assumes that write recorder 300 is capable of tracking all offline writes.

In act 330, cache manager 100 reads the cache metadata and persistence identifier from cache device 110 into memory. Cache manager 100 determines whether the persistence identifier can be verified (this is described further below). If not, cache manager 100 may evict the entire contents of cache device 110, or a portion thereof (e.g., corresponding to a particular disk volume for which the persistence identifier could not be verified). If the persistence identifier can be verified, cache manager 100 merges any write operations performed to disk storage since the computer was restarted with any write operations tracked by write recorder 300. For example, if one or more logs indicate the data written to each address on disk, cache manager 100 may select the latest update performed to each address and write it to memory.

In some embodiments, write recorder 300 may be configured to continue recording writes after the computer is restarted, so that cache manager 100 need not record writes performed after that point and merge them with writes tracked by write recorder 300. Instead, write recorder 300 may simply provide a record of all writes to cache manager 100.

Using the cache metadata read in act 330, cache manager 100 then applies the set of writes to the contents of cache device 110 in act 335. As described above, applying the writes may include evicting cache contents, updating cache contents, doing both, or performing some other operation(s). For example, offline writes tracked by write recorder 300 in act 315 may be applied by evicting the corresponding cache contents, while the writes tracked by cache manager 100 since the computer was restarted may be applied by updating the corresponding cache contents to reflect the writes. Applying write operations to cache contents may be performed in any suitable way, as the invention is not limited to any particular implementation.

At the completion of act 335, the process of FIG. 3 completes.

It should be appreciated that the invention is not limited to employing a write recorder component that is configured to become active when shutdown is initiated, as write operations not occurring during shutdown may also, or alternatively, be tracked. For example, in some implementations, a cache device may be susceptible to becoming inaccessible for periods of time. For example, if the cache device is accessed via one or more networks, connectivity could be lost, or if the cache device is removable from the computer, a surprise (e.g., unintentional) removal could occur. As a result, some embodiments may employ a write recorder to track all (or a portion of) writes performed to disk, not just those occurring during shutdown, and a cache device which is configured to periodically capture cache "snapshots" while still online. As such, if the cache becomes inaccessible for some period of time and is later reconnected, the latest cache snapshot can be updated using write operations tracked by the write recorder, rather than having to be completely rebuilt.

It should also be appreciated that while the example process 30 of FIG. 3 may detect offline writes performed by the operating system during shutdown, other measures may be needed to detect offline writes performed to disk after shutdown completes. Such writes may occur, for example, when a user boots the disk into another operating system after shutdown, or removes the disk from the computer after shutdown and connects it to another computer, and then modifies data stored on disk.

Recognizing the difficulties associated with attempting to track offline writes occurring after shutdown (e.g., by another operating system), some embodiments of the invention instead try to prevent them from occurring. For example, some embodiments attempt to make a particular disk volume inaccessible to operating systems that do not provide a write recorder component after shutdown. This may be accomplished in any of numerous ways.

In some embodiments, write recorder 300 may mark a disk volume in such a way that it becomes un-mountable by operating systems that do not provide a write recorder component to track offline writes. For example, write recorder 300 may modify the volume identifier that indicates the type of file system used on the volume. In this respect, those skilled in the art will recognize that a volume identifier enables an operating system to identify the type of file system used to store data on the volume, thereby enabling the operating system to understand the structure of data stored on the volume, where to find files, etc. For example, if a volume identifier indicates that an NT File System (NTFS) file system was used to store data on the volume, then another operating system attempting to mount the volume would understand that an NTFS file system would be needed to parse and access the data thereon. If the volume identifier provided no indication of the type of file system used to store data on the volume, most operating systems would fail to mount the volume, as there would be no reliable way to understand the structure of data stored thereon. As such, some embodiments of the invention modify the volume identifier of a disk volume to make it inaccessible, thereby preventing a user from booting the disk volume into another operating system and making offline changes to data stored on the volume.

Recognizing that some operating systems may be capable of identifying the type of file system used to store data on a volume even if the volume identifier were modified, some embodiments of the invention provide a mechanism for detecting when an operating system mounts the volume. In this respect, to mount a disk volume, any operating system would need to update the volume identifier (e.g., to indicate that a NTFS file system was employed to store data on the volume) to allow data thereon to be accessed. Any such update would be easily detectable upon reboot. If such an update were detected, some embodiments of the invention may assume that the contents of the volume had been modified since the last shutdown, and evict the cache contents corresponding to data stored on the volume.

Some embodiments of the invention provide a capability whereby a disk volume may be booted into another operating system which also employs a write recorder component. For example, if a disk were removed from one computer running an operating system that provides a write recorder component, and boots the disk into another operating system that provides a write recorder component, the other operating system might be configured to recognize that a changed volume identifier indicates that the volume may be cached. As a result, the other operating system may add to a log of offline writes (e.g., stored on the volume) created by the first operating system.

The above-described embodiments designed to make a disk volume un-mountable by certain operating systems may pose problems for certain applications which rely on the volume identifier to perform certain functions (e.g., backup applications). With these applications, if the volume identifier were changed, the volume may be unrecognizable and thus not backed up. Accordingly, some embodiments of the invention provide a mechanism for determining whether a file system was mounted after shutdown. If so, it is assumed that changes were made to data in the file system, and all cache contents corresponding to data in the file system may be evicted.

Some embodiments may detect the mounting of a file system after shutdown by placing the file system log at shutdown in a state which would require any operating system attempting to mount the file system to modify the log in some way (e.g., change its location, add a new entry, etc.). For example, write recorder 300 may note as part of the task of logging offline writes the location and/or content of the file system log when the file system is dismounted (e.g., in the log itself). Because any operating system attempting to mount the file system would have to change the log (e.g., if the file system were an NTFS file system, an operating system attempting to mount the file system would add an entry to the log), if the log has not changed upon reboot, it is assumed that the file system was not mounted by another operating system during the power transition, so that cache contents corresponding to data stored in the file system have not been rendered stale. Conversely, if the log has been changed in some way (e.g., its location has changed, and entry has been added, etc.) then it is assumed that the file system was mounted by another operating system, and that data stored therein has changed, rendering the cache contents corresponding to data stored in the file system stale. As such, these cache contents may be evicted.

In addition to providing mechanisms to prevent offline writes, some embodiments of the invention provide a capability to manage inconsistent generations of cache contents. Inconsistent generations of cache contents may be created for any of numerous reasons. One example may occur when first and second computers, having first and second cache devices connected thereto, employ techniques described herein to persist cache contents across power transitions. If the second cache device were connected to the first computer (or the first cache device connected to the second computer) and the first computer were restarted, incorrect data could be served from the second cache device to satisfy I/O requests. This is because the first computer's operating system could deem the contents of the second cache device authentic (since a regenerated representation of the data returned from cache could match a representation originally generated) and not stale (since offline writes could be applied to cache contents). Another example could arise if a first cache device were connected to a computer, the computer was shut down (thereby persisting cache contents), the computer was then restarted, a second cache device was connected, and the computer was shut down again (thereby persisting cache contents again). If the computer was then restarted again and the first cache device connected, incorrect data could be served to satisfy I/O requests, since there would be no reliable way to determine that the first cache device does not store the latest generation of cache contents.

Some embodiments provide a capability to identify inconsistent generations of cache contents so that cache contents persisted previous to the latest shutdown are not erroneously used to satisfy I/O requests. In some embodiments, this capability is provided via a unique persistence identifier, which may be generated (as an example) as shutdown is initiated, in any of numerous ways. For example, globally unique identifiers (GUIDs) and/or cryptographic random number generators may be employed for this purpose. As described above with reference to FIG. 3, the persistence identifier may be stored on the cache device (e.g., in or with cache metadata) as well as on the computer (e.g., on disk and/or memory) and verified (e.g., by comparing the two versions) as the computer is started. If verification is unsuccessful, cache contents may be evicted as representing a previous persisted cache generation.

As with the authentication keys discussed above, any keys used to generate a persistence identifier may be written to a location other than the cache device for the duration of a power transition. For example, in some embodiments a write recorder component may write the keys as well as the persistence identifier to disk storage (e.g., at shutdown). However, the invention is not limited to such an implementation, as those skilled in the art may envision numerous alternative locations in which keys may be saved. Keys may, for example, be kept in any configuration store provided by the operating system which is available during system boot (e.g., the registry in Microsoft Windows®).

III. Cache Metadata

As described above, cache metadata may provide a mapping between disk addresses where data items are stored and the corresponding addresses on a cache device where those data items are cached. Some embodiments of the invention provide a capability for storing cache metadata which significantly reduces the amount of memory required to store cache metadata during system runtime operations.

In addition, some embodiments provide techniques which allow cache metadata to be relied upon across power transitions or any other event which takes the cache device offline (e.g., removal of a cache device from the computer, a network outage which makes a network cache device inaccessible, etc.), so that cache contents may be reliably accessed when the computer is restarted and/or the cache device is brought online. In this respect, it should be appreciated that with certain types of power transitions (e.g., standby and hibernate modes), simply storing cache metadata in memory (i.e., a random access memory, or RAM) is acceptable since the contents of memory are preserved during standby and hibernate transitions. During reboot, however, the contents of system memory are not preserved. As such, some embodiments of the invention provide for storing cache metadata on some non-volatile medium/media during shutdown, and then restored upon reboot. For example, cache metadata may be stored on a cache device, and/or on one or more separate non-volatile media. Further, some embodiments may be capable of deriving some portions of cache metadata from others, so that storing all cache metadata is not required.

Some embodiments may employ the techniques described in Section I. above for verifying the authenticity of cache metadata, so as to detect and prevent inadvertent or malicious modifications to metadata when the cache device goes offline (e.g., during computer shutdown, removal of the cache device from the computer, a network outage which makes a network cache device inaccessible, etc.). For example, when the cache device comes online, the cache manager may verify the authenticity of metadata as it is loaded to memory, using the techniques described above with reference to FIGS. 2A-2B. If the authenticity of cache metadata can not be verified, the corresponding cache contents may be updated based on data stored on disk, evicted, or otherwise processed as described above.

In some embodiments, cache metadata may be compressed to reduce the amount of metadata to save during shutdown and load at reboot. Because compression of metadata may require saving a separate piece of information (e.g., a header in the cache) containing information about the metadata, the techniques described above may be employed to verify the authenticity of this information as well at reboot.

Some embodiments of the invention provide techniques for storing cache metadata in a manner which greatly reduces the amount of cache metadata stored in memory at any one time, thereby reducing the amount of time required to load cache metadata to, and offload it from, memory (e.g., during runtime and startup/shutdown operations) and greatly reducing the memory "footprint" of cache metadata. In this respect, it should be appreciated that with cache devices having relatively large storage capacity, a significant amount of metadata may be required to manage cache contents. For example, a cache device having a sixteen gigabyte storage capacity may be capable of storing up to thirty-two gigabytes of compressed data. In some implementations, disk addresses may be reflected in cache metadata in "data units" representing four kilobytes of disk storage. As such, to track the location of thirty-two gigabytes of data, eight million distinct data units are needed. If each of the eight million data units is represented in cache metadata using a sixteen-byte mapping (i.e., from a disk address to a cache address), then these mappings require one hundred twenty-eight megabytes of storage. Applicants have appreciated that storing one hundred twenty-eight megabytes of cache metadata in memory would occupy an unnecessarily large portion of memory in many computers. In addition, the time required to write one hundred twenty-eight megabytes of cache metadata from memory to non-volatile media during shutdown, and to restore one hundred twenty-eight megabytes of cache metadata from non-volatile media to memory at reboot, would be prohibitively time-consuming and consume an excessive amount of processing resources.

Recognizing that the amount of cache metadata can not easily be reduced, some embodiments of the invention provide techniques designed to reduce the storage resources needed to store cache metadata, as well as the time and processing resources required to save and restore cache metadata at shutdown and startup.

In some embodiments, this is accomplished by storing cache metadata in one or more hierarchical data structures (e.g., trees, multi-level arrays, etc.). Employing a hierarchical data structure may allow lower levels of the hierarchy to be stored on a non-volatile medium (e.g., the cache device) while only higher levels of the hierarchy are stored in memory. For example, in some embodiments, only higher levels of the hierarchy are stored in memory, so that the "footprint" occupied by memory in cache metadata may be greatly reduced, even while an amount of cache metadata needed to support cache devices having significant storage capacity is stored overall. Alternatively, only higher levels of the hierarchy may be stored in cache metadata, as some embodiments may provide for storing some information kept at lower levels of the hierarchy in memory so as to reduce the I/O overhead associated with repeat accesses to this information. The invention is not limited to being implemented in any particular fashion.

During system operation, as read requests are processed, the cache metadata that is read from the non-volatile medium (i.e., from lower levels of the hierarchy) to perform the read operation may be "paged in" to (i.e., read from a storage medium into) memory so that it may be more quickly accessed for subsequent read requests to the same disk/cache address. When the computer is later shut down and/or the cache device is brought offline, only the cache metadata stored at the higher levels of the hierarchy, and the cache metadata to be stored in the lower levels of the hierarchy which was paged into memory, may need to be saved to the non-volatile medium. As such, the time required to move cache metadata from memory to non-volatile storage at shutdown, and to restore cache metadata from non-volatile storage to memory at reboot, may be significantly reduced.

Some embodiments of the invention employ a B+ tree to store at least a portion of cache metadata. As those skilled in the art will appreciate, B+ trees may employ large branching factors, and therefore reduce the number of levels in the hierarchy employed. Using the example given above, if eight million data units are to be represented in cache metadata and a B+ tree with a branching factor of two hundred were employed (so that each node in the hierarchy has two hundred "child" nodes), a data structure having only three levels would be sufficient to store the metadata: a single "root" node at the highest level, two hundred nodes at the second level, and forty thousand nodes at the third level, with each of the forty thousand nodes including pointers to two hundred data units (or eight million data units total).

Figure 4:
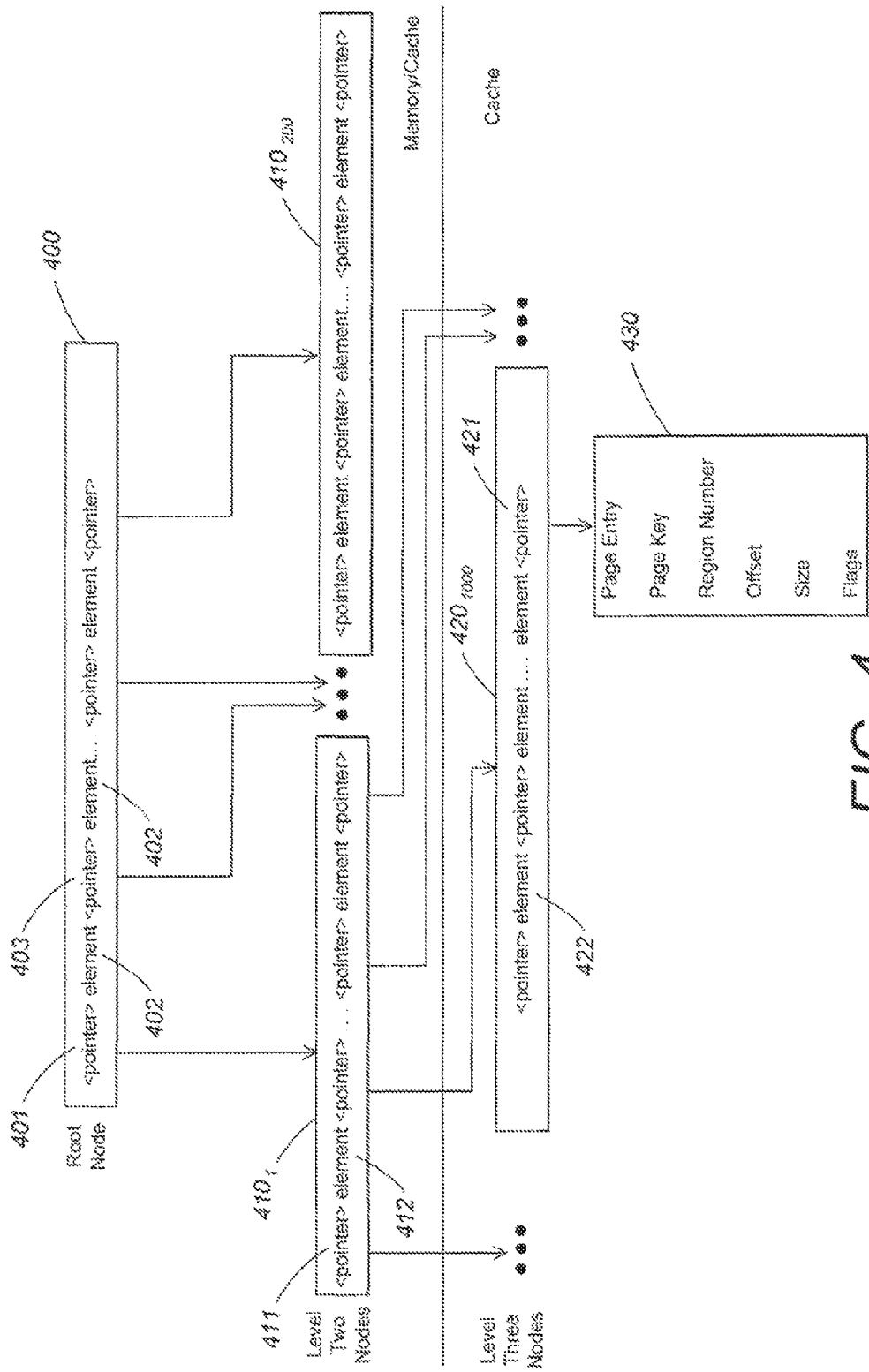
FIG. 4 is a block diagram depicting an exemplary technique for storing cache metadata, in accordance with some embodiments of the invention.

FIG. 4 depicts this example B+ tree which includes root node 400, level two nodes $410_{1-200}$ and level three nodes $420_{1-40000}$ (only node $420_{1000}$ is shown for clarity). Each node includes two hundred elements each separated by pointers to nodes at a lower level in the hierarchy. For example, element 402 in root node 400 is delimited by pointers 401 and 403. A value (e.g., a cache address) associated with a given key (e.g., a disk address) may be determined by following the pointer to the left or right of an element in a node, with the pointer to the left of the element being followed if the key is less than the element, and the pointer to the right being followed if the key is greater than the element. For example, to determine a value for a key which is less than element 402, pointer 401 would be followed to level two node $410_1$, to determine a value for a key greater than element 402 but less than element 404, pointer 403 would be followed to level two node $410_2$ (not shown), and so on. Similarly, at the level two node, a pointer to the left or right of an element (depending on whether the key is less than or greater than elements in the node) is followed to a level three node. At level three, a final pointer is followed (again based on whether the key is less than or greater than elements in the node) to the value, with each pointer at level three referencing one of the eight million data units (such as data unit 430) in cache metadata.

It should be appreciated that a B+ tree with a large branching factor provides a relatively "flat" hierarchy with almost all nodes being located at the bottom level of the hierarchy. That is, of the 40,201 total nodes in the tree, 40,000 are at the lowest level. Some embodiments of the invention take advantage of this by restoring only the top two levels of the hierarchy to memory at startup, while the cache metadata in the lowest level of the hierarchy is stored on the cache device until needed (e.g., it may be loaded into memory on demand as read requests are processed, loaded lazily, etc.). Because only a portion of the hierarchical data structure is stored in memory, the cache metadata may occupy a much smaller portion of memory than would otherwise be required if the entirety of, or larger portion of, cache metadata were maintained in memory. In addition, when the computer is shut down, only the data at the top two levels and the data loaded into memory during operation need to be stored on the cache device. As a result, both startup and shutdown operations may be performed quickly and efficiently.

Thus, some embodiments of the invention provide for pointers in nodes at one level of the hierarchy stored in memory (in the example above, level two of the hierarchy) which reference nodes at another level of the hierarchy stored on the cache device (in the example above, level three). For example, when a read request for a cached data item is received, embodiments of the invention follow pointers through one or more levels of the hierarchy stored in memory, and then to metadata at lower levels of the hierarchy stored in cache, to determine the address at which the data item is stored in cache. In some embodiments, once the cache address is determined for the data item, it may be stored in memory so that subsequent requests to read the item may be performed without having to read cache metadata from the cache device.

Figure 5:
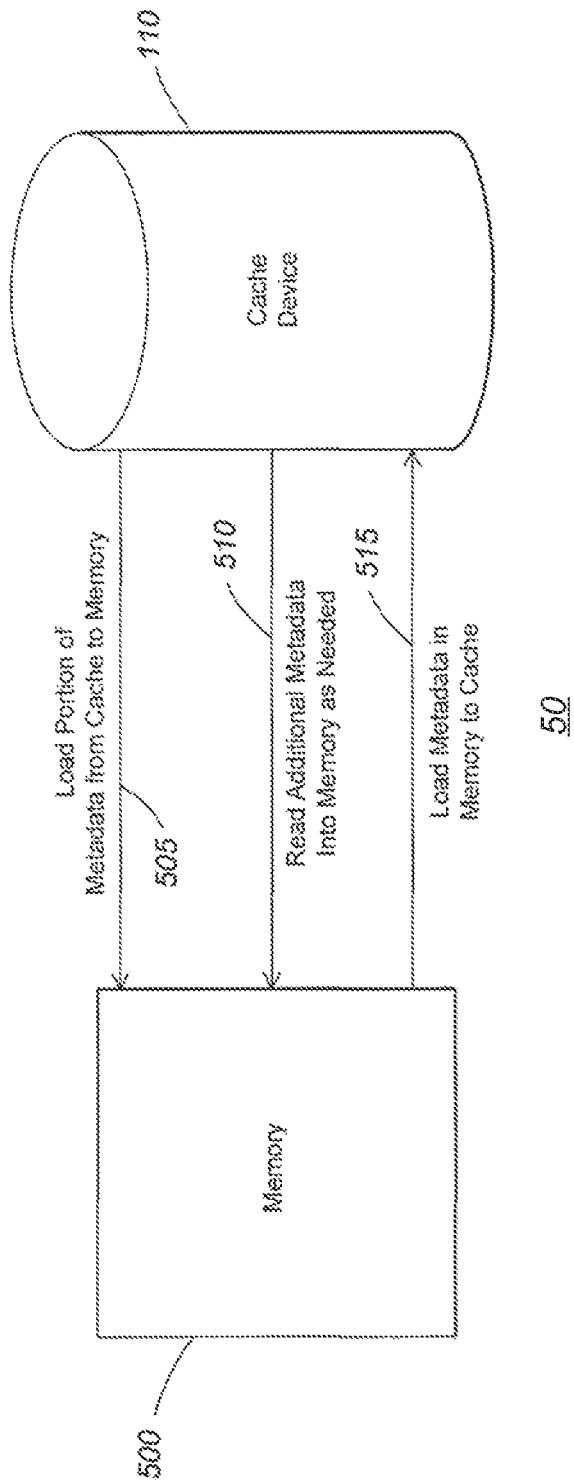
FIG. 5 is a block diagram depicting exemplary storage operations for cache metadata, in accordance with some embodiments of the invention.

FIG. 5 depicts an example system 50 for managing cache metadata in accordance with some embodiments of the invention. FIG. 5 depicts memory 500 and cache device 110, both accessible to a computer (not shown). When the computer is started, cache metadata comprising one or more levels of a hierarchical data structure such as a B+ tree are loaded to memory 500 in operation 505. Using the example above to illustrate: if there are eight million data units represented in cache metadata, and a three-level hierarchical data structure is used to store the cache metadata, then the top two levels of the hierarchy may be loaded to memory 500. Of course, if more or less than eight million data units are be represented in metadata, and a hierarchical data structure having more or less than three levels is to be used, then a different number of levels to the hierarchy may be loaded to memory 500.

Thereafter, when a read request is directed to a data item maintained in cache, the cache address at which the data item is stored is determined by accessing cache metadata stored in the level(s) of the hierarchy stored in cache device 110. This cache metadata is then stored in memory in operation 510, so that subsequent reads or writes to the data item may be performed without having to read cache metadata stored on the cache device to determine the cache address at which the data item is stored. Instead, the cache address may be read from memory, which may be performed more quickly than a read to cache.

Later, when the computer is shut down, the cache metadata stored in memory (i.e., the metadata stored in the levels of the hierarchy loaded to memory in operation 505, and any metadata used to satisfy read requests written to memory in operation 510) is loaded to cache device 500 in operation or act 515. As a result of the relatively small amount of cache metadata stored in memory, shutdown may be performed quickly, without requiring substantial processing resources.

It should be appreciated that a B+ tree is but one of numerous types of data structures which may be employed to store cache metadata, and that other types of data structures (e.g., hierarchical structures such as Adelson-Velskii Landis (AVL) trees, red-black trees, binary search trees, B-trees and/or other hierarchical and non-hierarchical data structures) may be employed. The invention is not limited to employing any one data structure or combination of data structures to store cache metadata.

Some embodiments may provide for a "target amount" of cache metadata to be kept in memory at any one time. The target amount may be determined in any suitable fashion. For example, a target amount may be a percentage of the amount of physical memory available to a computer. For example, if the computer has one gigabyte of memory, then two megabytes of cache metadata (as an example) may be stored in memory at any one time. Thus, when the computer is shut down, only two megabytes of cache metadata need to be loaded to the cache device.

In some embodiments, cache metadata may be cycled in and out of memory. For example, if a target amount of cache metadata is already stored in memory, and a read is performed which requires cache metadata to be read from the cache device, that metadata may be "paged in" to memory, and other cache metadata (e.g., that which was accessed least recently) may be erased. For example, cache metadata may be erased after being written to the cache device. Alternatively, the system may determine whether the cache metadata has changed since the last time it was written out, and if not, it may simply be erased, thus eliminating the time and processing resources otherwise required to write the cache metadata. Using the techniques described above, the small "footprint" occupied by cache metadata in memory may be maintained.

Figure 6:
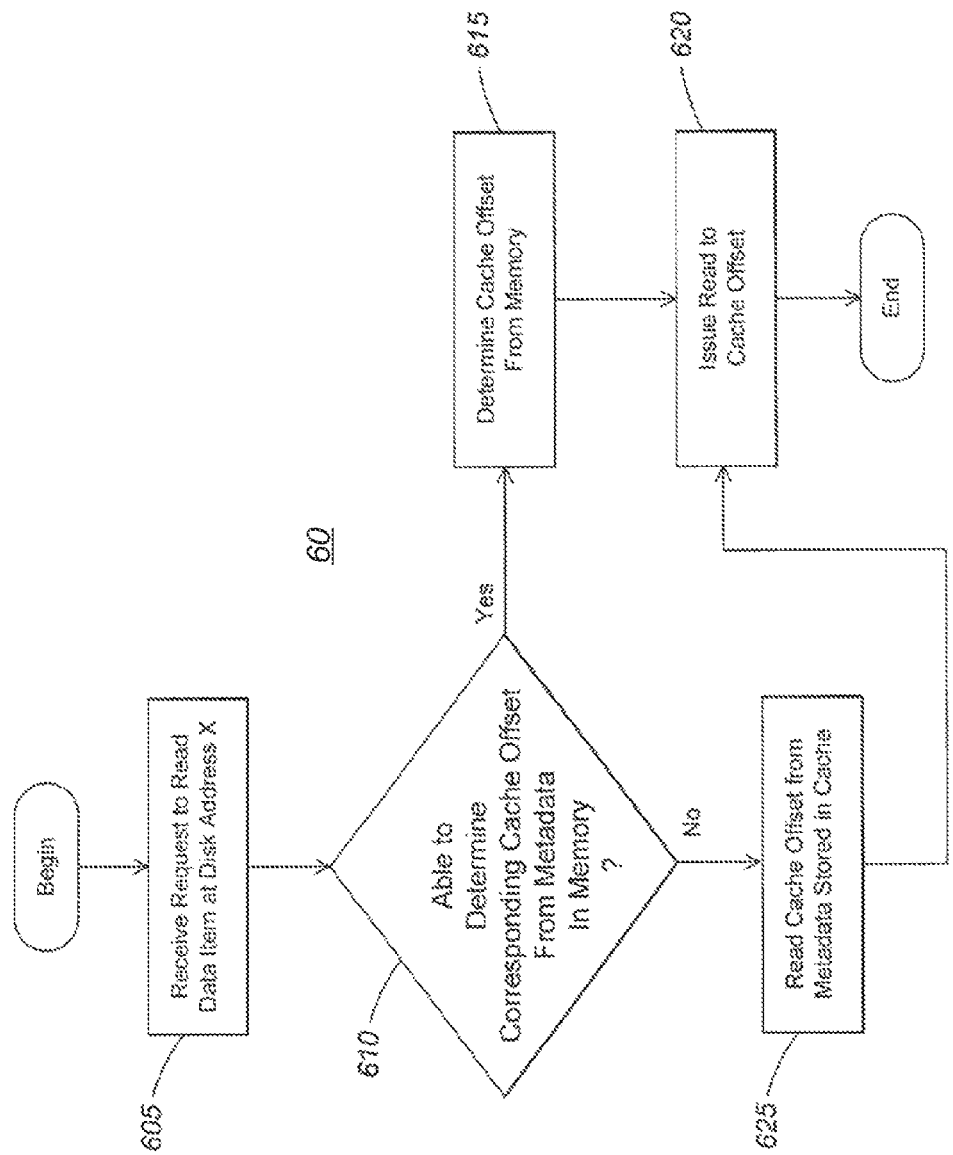
FIG. 6 is a flowchart depicting an exemplary technique for servicing read requests using a cache device, in accordance with some embodiments of the invention.

FIG. 6 depicts an example. Specifically, process 60 shown in FIG. 6 includes operations which may be performed by cache manager 100 (FIG. 3) to read cache metadata using the techniques described above.

At the start of process 60, a request is received in step or act 605 to read data stored at disk address X. In act 610, a determination is made whether the cache address or offset at which the data is stored can be identified from cache metadata stored in memory. If so, the process proceeds to act 615, wherein the identified cache address or offset is determined, and then used to issue a read request to cache device 110 in act 620. Process 60 then completes. If the cache address can not be identified in step or act 610 using cache metadata stored in memory, then the process proceeds to act 625, wherein cache metadata is read from cache device 110 to determine the cache address or offset at which the data is stored. Using the cache offset identified in act 625, a read request is issued to the identified cache offset in act 620, and process 60 then completes.

It should be appreciated that storing cache metadata on the cache device may not only speed up the process of loading and restoring cache metadata during startup and shutdown, but may also speed up the system operations performed during startup and shutdown. In this respect, shutdown and startup often involve multiple accesses to certain data items, and performing two read operations to a cache device is typically faster than performing one read operation to disk storage. As a result, if a data item accessed during shutdown and/or startup and the metadata which specifies its location were both stored in cache, then the data item might be accessed more quickly then if the data item were stored on disk, since the two reads to cache (i.e., one to access cache metadata to determine the item's location, and a second to access the item itself) can typically be performed more quickly than a single read to disk. As such, individual operations performed during shutdown and startup may be expedited. Even further, if during a first read of cache metadata from cache the address at which the item is stored is paged into memory, then subsequent reads of the data item could be performed even more quickly, since a read to memory can typically be performed more quickly than a read to cache.

Figure 7:
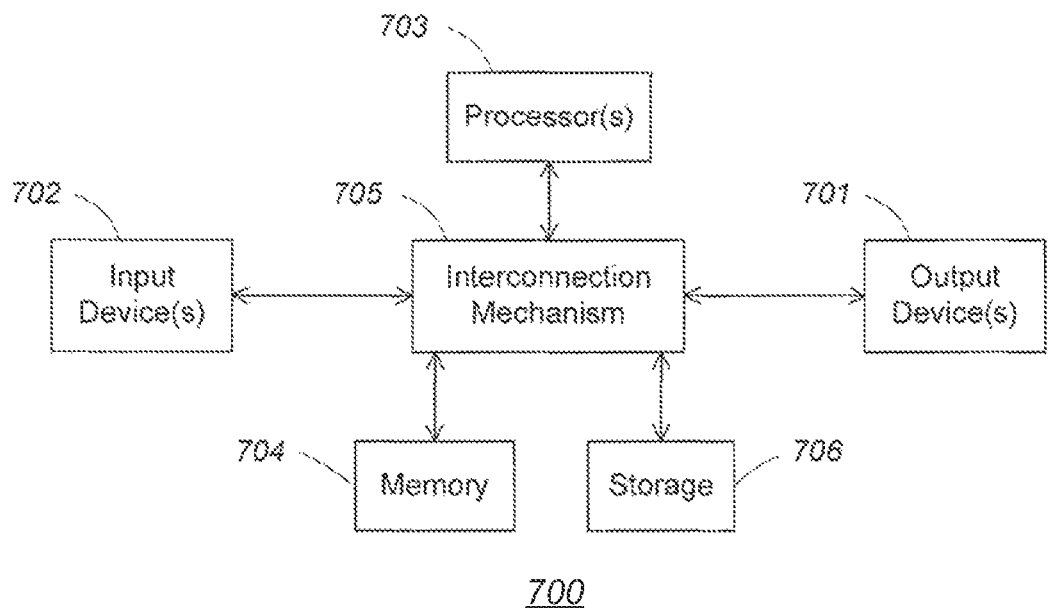
FIG. 7 is a block diagram depicting an example computer which may be used to implement aspects of the invention.

Various aspects of the systems and methods for practicing features of the invention may be implemented on one or more computer systems, such as the exemplary computer system 700 shown in FIG. 7. Computer system 700 includes input device(s) 702, output device(s) 701, processor(s) 703, memory system 704 and storage 706, all of which are coupled, directly or indirectly, via interconnection mechanism 705, which may comprise one or more buses, switches, networks and/or any other suitable interconnection. The input device(s) 702 receive(s) input from a user or machine (e.g., a human operator), and the output device(s) 701 display(s) or transmit(s) information to a user or machine (e.g., a liquid crystal display). The processor(s) 703 typically execute(s) a computer program called an operating system (e.g., a Microsoft Windows®-family operating system, or any other suitable operating system) which controls the execution of other computer programs, and provides scheduling, input/output and other device control, accounting, compilation, storage assignment, data management, memory management, communication and dataflow control. Collectively, the processor(s) and operating system define the computer platform for which application programs and other computer program languages are written.

The processor(s) 703 may also execute one or more computer programs to implement various functions. These computer programs may be written in any type of computer program language, including a procedural programming language, object-oriented programming language, macro language, or combination thereof. These computer programs may be stored in storage system 706. Storage system 706 may hold information on a volatile or non-volatile medium, and may be fixed or removable. Storage system 706 is shown in greater detail in FIG. 8.

Figure 8:
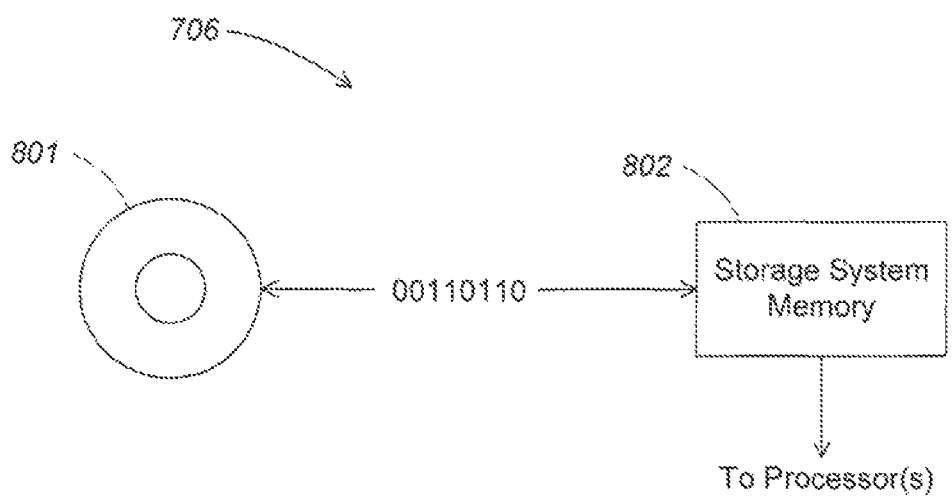
FIG. 8 is a block diagram depicting an example computer memory on which instructions implementing aspects of the invention may be recorded.

Storage system 706 typically includes a computer-readable and writable nonvolatile recording medium 801, on which signals are stored that define a computer program or information to be used by the program. A medium may, for example, be a disk or flash memory. Typically, in operation, the processor(s) 703 cause(s) data to be read from the nonvolatile recording medium 801 into a volatile storage system memory 802 (e.g. RAM) that allows for faster access to the information by the processor(s) 703 than does the medium 801. The storage system memory 802 may be located in the storage system 706, as shown in FIG. 8, or in memory system 704, as shown in FIG. 7. The processor(s) 703 generally manipulate(s) the data within the integrated circuit memory system 704, system memory 802 and then copies the data to the medium 801 after processing is completed. A variety of mechanisms are known for managing data movement between the medium 801 and the integrated circuit memory system 704, system memory 802, and the invention is not limited thereto. The invention is also not limited to a particular memory system 704 or storage system 706.

Further, embodiments of the invention are also not limited to employing a cache manager component which is implemented as a driver in the I/O stack of an operating system. Any suitable component or combination of components, each of which may be implemented by an operating system or one or more standalone components, may alternatively or additionally be employed. The invention is not limited to any particular implementation.

The above-described embodiments of the present invention can be implemented in any of numerous ways. For example, the above-discussed functionality can be implemented using hardware, software or a combination thereof. When implemented in software, the software code can be executed on any suitable processor or collection of processors, whether provided in a single computer or distributed among multiple computers. In this respect, it should be appreciated that any component or collection of components that perform performs the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

Further, it should be appreciated that a (client or server) computer may be embodied in any of a number of forms, such as a rack-mounted computer, desktop computer, laptop computer, tablet computer, or other type of computer. Additionally, a (client or server) computer may be embedded in a device not generally regarded as a computer but with suitable processing capabilities, including a Personal Digital Assistant (PDA), a smart phone or any other suitable portable or fixed electronic device.

Also, a (client or server) computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks. Also, the various methods or processes outlined herein may be coded as software that is executable on one or more processors that employ any one of a variety of operating systems or platforms.

Additionally, software may be written using any of a number of suitable programming languages and/or conventional programming or scripting tools, and also may be compiled as executable machine language code or intermediate code that is executed on a framework or virtual machine.

In this respect, the invention may be embodied as a storage medium (or multiple storage media) (e.g., a computer memory, one or more floppy disks, compact disks, optical disks, magnetic tapes, flash memories, circuit configurations in Field Programmable Gate Arrays or other semiconductor devices, or other computer storage media) encoded with one or more programs that, when executed on one or more computers or other processors, perform methods that implement the various embodiments of the invention discussed above. The storage medium or media can be transportable, such that the program or programs stored thereon can be loaded onto one or more different computers or other processors to implement various aspects of the present invention as discussed above.

The terms "storage medium" and "storage media" as used herein, with or without a modifier, refer strictly to a statutory article(s) of manufacture that is (are) not a signal or any other non-statutory subject matter per se.

The terms "program" and "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be provided in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for operating a computer that is coupled to a storage medium and a cache device, the computer comprising an operating system, the method comprising acts of:
   (A) activating a write recorder component configured for identifying write operations performed to the storage medium which are not performed to the cache device;
   (B) in response to a request to write a data item to the storage medium at an address, causing the data item to be written to the storage medium at the address and to the cache device at a corresponding address;
   (C) capturing a snapshot of the data item written to the cache device at the corresponding address;
   (D) subsequent to a reboot of the operating system, determining whether the data item written to the cache device at the corresponding address can reliably be used to satisfy a request to read the data item from the storage medium at the address, the determining including determining, via the write recorder component, whether the data item written to the storage medium at the address was modified after completion of act (B); and
   (E) if it is determined in act (D) that the data item written to the cache device at the corresponding address cannot reliably be used to satisfy the request to read the data item from the storage medium at the address, then causing the cache device to be updated using the snapshot and data from the write recorder component.

2. The method of claim 1, wherein the acts (A)-(E) are performed by the operating system.

3. The method of claim 1, wherein the storage medium comprises a disk storage device.

4. The method of claim 1, wherein the cache device is removable from the computer.

5. The method of claim 1, wherein the operating system is configured for activating the write recorder component when it is determined that the operating system is being shut down.

6. The method of claim 1, wherein the act (D) is performed in response to the request to read the data item from the storage medium at the address, and the method further comprises verifying that the data item written to the cache device at the corresponding address was not modified after completion of the act (B).

7. The method of claim 6, wherein act (B) further comprises generating a representation of at least the data item written to the storage medium at the address and writing the representation to the cache device, and wherein the act of verifying in act (D) comprises:
   (D1) retrieving the representation that was written to the cache device;
   (D2) re-generating the representation; and
   (D3) comparing the retrieved representation to the re-generated representation to determine whether the data item written to the cache device at the corresponding address can reliably be used to satisfy the request to read the data item written to the storage medium at the address.

8. At least one computer storage medium that is a memory device storing instructions that, when executed by a computer comprising an operating system and coupled to a cache device, cause the computer to perform a method comprising acts of:
   (A) activating a write recorder component configured for identifying write operations performed to the computer storage medium which are not performed to the cache device;
   (B) in response to a request to write a data item to the computer storage medium at an address, causing the data item to be written to the computer storage medium at the address and to the cache device at a corresponding address;

(C) capturing a snapshot of the data item written to the cache device at the corresponding address;

(D) subsequent to a reboot of the operating system, determining whether the data item written to the cache device at the corresponding address can reliably be used to satisfy a request to read the data item from the computer storage medium at the address, the determining including determining, via the write recorder component, whether the data item written to the computer storage medium device at the address was modified after completion of act (B); and (E) if it is determined in act (D) that the data item written to the cache device at the corresponding address cannot reliably be used to satisfy the request to read the data item from the storage medium at the address, then causing the cache device to be updated using the snapshot and data from the write recorder component.

9. The at least one computer storage medium of claim 8, wherein the act (E) further comprises causing the data item to be read from the computer storage medium at the address when it is determined, after the update, that the data item written to the cache device at the corresponding address cannot reliably be used to satisfy the request to read the data item from the storage medium at the address.

10. The at least one computer storage medium of claim 8, wherein the act (E) further comprises causing the data item to be evicted from the cache device at the corresponding address when it is determined that, after the update, the data item written to the cache device at the corresponding address cannot reliably be used to satisfy the request to read the data item from the storage medium at the address.

11. The at least one computer storage medium of claim 8, wherein the act (B) further comprises generating a representation of at least the data item written to the storage medium at the address and writing the representation to the cache device, wherein the act of determining in act (D) comprises:

(D1) retrieving the representation that was written to the cache device;

(D2) re-generating the representation; and (D3) comparing the retrieved representation to the re-generated representation to determine whether the data item written to the cache device at the corresponding address can reliably be used to satisfy the request to read the data item written to the storage medium at the address.

12. The at least one computer storage medium of claim 8, wherein the act (B) further comprises generating a representation of at least the data item written to the storage medium at the address and writing the representation to the cache device, wherein the act of generating a representation comprises employing a cryptographic technique.

13. The at least one computer storage medium of claim 8, wherein the act (B) further comprises employing cache metadata to determine the corresponding address on the cache device to which the data item is written, and wherein the act (D) further comprises determining whether the cache metadata was modified after act (B).

14. A computer, comprising:
a storage medium having at least one address at which data is stored;
a cache device having at least one address at which data is stored;
a write recorder component configured for identifying write operations performed to the storage medium which are not performed to the cache device;
at least one processor programmed via an operating system to:
in response to a request to write a data item to the storage medium at a first address, cause the data item to be written to the storage medium at the first address and to the cache device at a corresponding address;
capture a snapshot of the data item written to the cache device at the corresponding address;
identify, via the write recorder component, an occurrence of a write operation to the storage medium at the first address which is not also performed to the cache device at the corresponding address;
determine, subsequent to a reboot of the operating system, whether the data item written to the cache device at the corresponding address can reliably be used to satisfy a request to read the data item from the storage medium at the first address, at least in part by determining, via the write recorder component, whether the data item written to the storage medium at the first address was modified after it was written to the storage medium at the first address and to the cache device at the corresponding address; and
upon determining that the data item on the cache device at the corresponding address cannot reliably be used to satisfy the request to read the data item from the storage medium at the first address, causing the cache device to be updated using the snapshot and data from the write recorder component.

15. The computer of claim 14, wherein the at least one processor is programmed to, if it is determined that the data item stored on the cache device at the corresponding address cannot reliably be used to satisfy the read request to read the data item from the storage medium at the first address, evict the data item from the cache device at the corresponding address, and satisfy the request by reading the data item from the storage medium at the first address.

16. The computer of claim 14, wherein the operating system is configured to activate the write recorder component when it is determined that the operating system is being shut down.

17. The computer of claim 14, wherein the write operation which the at least one processor is programmed to identify is to a file system on the storage medium, and wherein the at least one processor is programmed to identify an occurrence of a write operation to the storage medium at an address by placing a log used by the file system in a particular state prior to the reboot of the operating system, and determining whether the log is in the particular state following the reboot of the operating system.

18. The computer of claim 14, wherein the at least one processor is programmed to prevent an occurrence of a write operation to the storage medium at the first address which is not also performed to the cache device at the corresponding address.

19. The computer of claim 18, wherein the write operation which the at least one processor is programmed to prevent is to a volume on the storage medium, and wherein the at least one processor is programmed to prevent the occurrence of the write operation to the storage medium at the first address by making the volume inaccessible.

* * * * *